(12) United States Patent
Ito

(10) Patent No.: US 9,235,360 B2
(45) Date of Patent: Jan. 12, 2016

(54) PRINTING SYSTEM, SERVER FOR DISTRIBUTING PRINT JOB, METHOD FOR RESUBMITTING PRINT JOB, AND COMPUTER-READABLE STORAGE MEDIUM FOR COMPUTER PROGRAM

(75) Inventor: Yugo Ito, Itami (JP)

(73) Assignee: KONICA MINOLTA BUSINESS TECHNOLOGIES, INC., Chiyoda-Ku, Tokyo (JP)

(*) Notice: Subject to any disclaimer, the term of this patent is extended or adjusted under 35 U.S.C. 154(b) by 16 days.

(21) Appl. No.: 13/491,049

(22) Filed: Jun. 7, 2012

(65) Prior Publication Data
US 2012/0320419 A1 Dec. 20, 2012

(30) Foreign Application Priority Data
Jun. 20, 2011 (JP) ................................ 2011-136076

(51) Int. Cl.
G06F 3/12 (2006.01)
H04N 1/00 (2006.01)
H04N 1/32 (2006.01)

(52) U.S. Cl.
CPC ............ G06F 3/1204 (2013.01); G06F 3/1208 (2013.01); G06F 3/1267 (2013.01); G06F 3/1288 (2013.01); H04N 1/0023 (2013.01); H04N 1/00233 (2013.01); H04N 1/00244 (2013.01); H04N 1/32523 (2013.01); G06F 3/1238 (2013.01); H04N 2201/0094 (2013.01); H04N 2201/3205 (2013.01); H04N 2201/3221 (2013.01); H04N 2201/3222 (2013.01); H04N 2201/3273 (2013.01); H04N 2201/3274 (2013.01); H04N 2201/3278 (2013.01)

(58) Field of Classification Search
CPC ... G06F 3/1234; G06F 3/1255; G06F 3/1257; G06F 3/1273; G06F 3/1204; G06F 3/1288; G06F 3/1205; G06F 3/1258; H04N 2201/3205; H04N 2201/3274
USPC ............................... 358/1.15, 1.16, 406, 1.13
See application file for complete search history.

(56) References Cited

U.S. PATENT DOCUMENTS

| | | | |
|---|---|---|---|
| 6,529,288 B1 | 3/2003 | Miyazaki | |
| 2001/0011283 A1* | 8/2001 | Kato et al. | 707/511 |
| 2002/0097429 A1* | 7/2002 | Ferlitsch | 358/1.15 |
| 2006/0045597 A1* | 3/2006 | Leslie et al. | 400/76 |
| 2007/0127050 A1* | 6/2007 | Iwata et al. | 358/1.13 |

FOREIGN PATENT DOCUMENTS

| | | |
|---|---|---|
| CN | 1975659 A | 6/2007 |
| JP | 09-179704 A | 7/1997 |
| JP | 2000-211197 | 8/2000 |
| JP | 2002-032205 A | 1/2002 |
| JP | 2004-288032 A | 10/2004 |
| JP | 2004-362487 | 12/2004 |
| JP | 2010-224618 A | 10/2010 |

OTHER PUBLICATIONS

Japanese Notification of Reason(s) for Refusal issued Sep. 17, 2013 in corresponding Japanese Patent Application No. 2011-136076 and English language translation (6 pages).
Chinese Office Action dated Jul. 2, 2014 issued in the corresponding Chinese Patent Application No. 201210195833.9 and English language translation (19 pages).

* cited by examiner

*Primary Examiner* — Marivelisse Santiago-Cordero
*Assistant Examiner* — Kent Yip
(74) *Attorney, Agent, or Firm* — Buchanan Ingersoll & Rooney PC

(57) ABSTRACT

A printing system includes a registration portion configured to, when a print job to print an image onto a sheet of paper is executed after specified conditions are modified, store attribute data containing a user identifier and a job identifier into a storage portion, the user identifier being for identifying a user who has given a command to execute the print job, the job identifier being for identifying the print job; a determining portion configured to, when the user identifier is entered, determine whether or not the print job corresponding to the job identifier of the attribute data containing the user identifier can be executed in accordance with the conditions; and a re-execution portion configured to, when the determining portion determines that the print job can be executed in accordance with the conditions, execute the print job once again.

12 Claims, 27 Drawing Sheets

FIG. 12

```
┌─────────────────────────────────────────┐
│          REPRINT TICKET LIST            │
│                                         │
│      PLEASE SELECT A JOB ID CODE OF     │
│      A PRINT JOB TO BE EXECUTED.        │
│                                         │
│           ┌─────────────────────┐       │
│           │  user1001doc-002    │       │
│           ├─────────────────────┤       │
│           │  user1011doc-010    │       │
│           └─────────────────────┘       │
│                                         │
└─────────────────────────────────────────┘
                     WN2
```

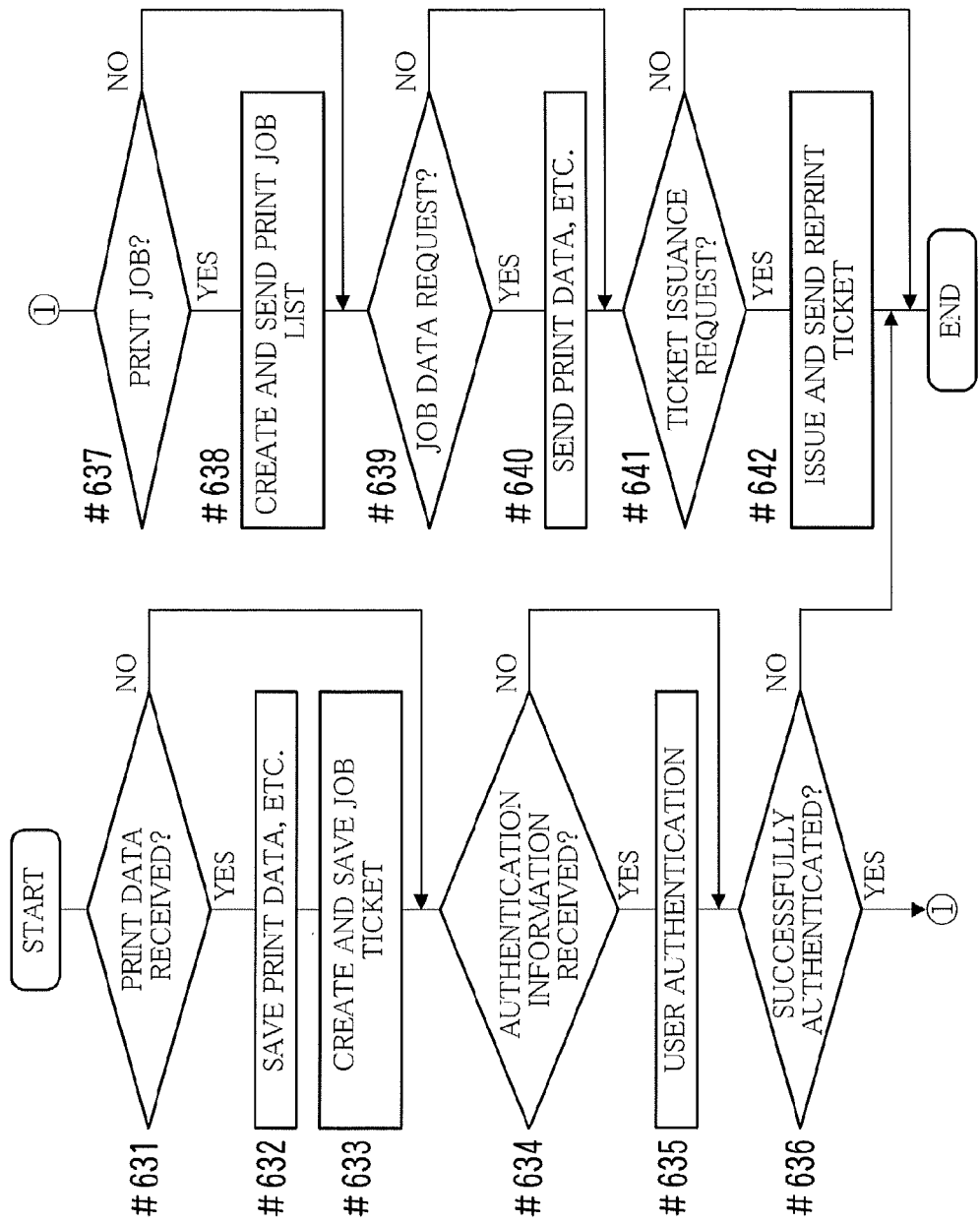

PRINTING SYSTEM, SERVER FOR DISTRIBUTING PRINT JOB, METHOD FOR RESUBMITTING PRINT JOB, AND COMPUTER-READABLE STORAGE MEDIUM FOR COMPUTER PROGRAM

This application is based on Japanese patent application No. 2011-136076 filed on Jun. 20, 2011, the contents of which are hereby incorporated by reference.

BACKGROUND OF THE INVENTION

1. Field of the Invention

The present invention relates to a system for executing a print job, a server for providing a printer with print job data, and so on.

2. Description of the Related Art

Recent years have seen the widespread use of image forming apparatuses that include various functions such as copying, scanning, faxing, and PC printing. Such an image forming apparatus is called a "Multi-Functional Peripheral" (MFP) or a "multifunction device". Further, there are proposed functions of the image forming apparatus which are implemented in conjunction with a server. One of the functions is a pull printing function.

According to the pull printing function, print data sent from a personal computer is temporarily saved to a server named "pull printing server" instead of being received promptly by an image forming apparatus. The pull printing server is operable to receive print data from personal computers installed in different locations and to manage the print data collectively. Thereafter, when a user goes to the installation location of a certain image forming apparatus and performs predetermined operation thereon, the pull printing server sends print data of the user to the image forming apparatus.

A method is also proposed which enhances convenience for a user to instruct an image forming apparatus to execute, once again, a printing process that was executed before.

In a conventional technology, ID information is added to a printed matter to perform printing. Thereafter, when the ID information is read out, image information is downloaded based on the ID information to perform printing once again (Japanese Laid-open Patent Publication No. 2004-362487).

In another conventional technology, information on a storage location of data serving as the basis of a printed matter is printed onto the printed matter. Then, the data is downloaded from the storage location to print the image once again (Japanese Laid-open Patent Publication No. 2000-211197).

As described above, the pull printing function enables a user to instruct any image forming apparatus to execute a print job and to obtain a printed matter.

However, specifications sometimes differ from one image forming apparatus to another. Further, some image forming apparatuses sometimes have a problem such as being out of consumables. Accordingly, a user sometimes cannot obtain a desired printed matter from an image forming apparatus selected by him/her. In such a case, the user instructs another image forming apparatus to perform printing. Alternatively, after the problem is solved, the user instructs, once again, the image forming apparatus that was instructed to perform printing before to do so.

The foregoing conventional technologies save a user from a burdensome task of giving instructions to perform printing once again. However, desired printed matters are not always obtained.

SUMMARY

The present invention has been achieved in light of such an issue, and an object thereof is to provide a technology that enables a user to obtain a printed matter desired by him/her more reliably than is conventionally possible by performing printing once again.

According to an aspect of the present invention, a printing system includes a registration portion configured to, when a print job to print an image onto a sheet of paper is executed after specified conditions are modified, store attribute data containing a user identifier and a job identifier into a storage portion, the user identifier being for identifying a user who has given a command to execute the print job, the job identifier being for identifying the print job; a determining portion configured to, when the user identifier is entered, determine whether or not the print job corresponding to the job identifier of the attribute data containing the user identifier can be executed in accordance with the conditions; and a re-execution portion configured to, when the determining portion determines that the print job can be executed in accordance with the conditions, execute the print job once again.

Preferably, the printing system includes a printing unit configured to print, onto a sheet of paper, the job identifier and the user identifier contained in the attribute data.

According to another aspect of the present invention, a server for distributing, to a plurality of printers, print job data used for executing a print job to print an image onto a sheet of paper is provided. The server includes a registration portion configured to, when a job execution printer that is one of the printers executes the print job after specified conditions are modified, store attribute data containing a user identifier and a job identifier into a storage portion, the user identifier being for identifying a user who has given a command to execute the print job, the job identifier being for identifying the print job; and a transmission portion configured to, when a determination is made as to whether or not the print job corresponding to the job identifier of the attribute data containing the user identifier of a user of a to-be-used printer that is one of the printers can be executed in accordance with the conditions, and when it is determined that the print job can be executed in accordance with the conditions, send the print job data on the print job to the to-be-used printer.

Preferably, the determination is made by the to-be-used printer. Preferably, the server includes a determination portion configured to make the determination.

Preferably, the server includes a deletion portion configured to, when the transmission portion sends the print job corresponding to the job identifier contained in the attribute data, delete the attribute data from the storage portion.

These and other characteristics and objects of the present invention will become more apparent by the following descriptions of preferred embodiments with reference to drawings.

BRIEF DESCRIPTION OF THE DRAWINGS

FIG. 12 is a diagram showing an example of a reprint ticket screen.

FIG. 27 is a flowchart depicting an example of the flow of overall processing performed by a server according to the third embodiment.

DESCRIPTION OF THE PREFERRED EMBODIMENTS

[First Embodiment]

Figure 1:
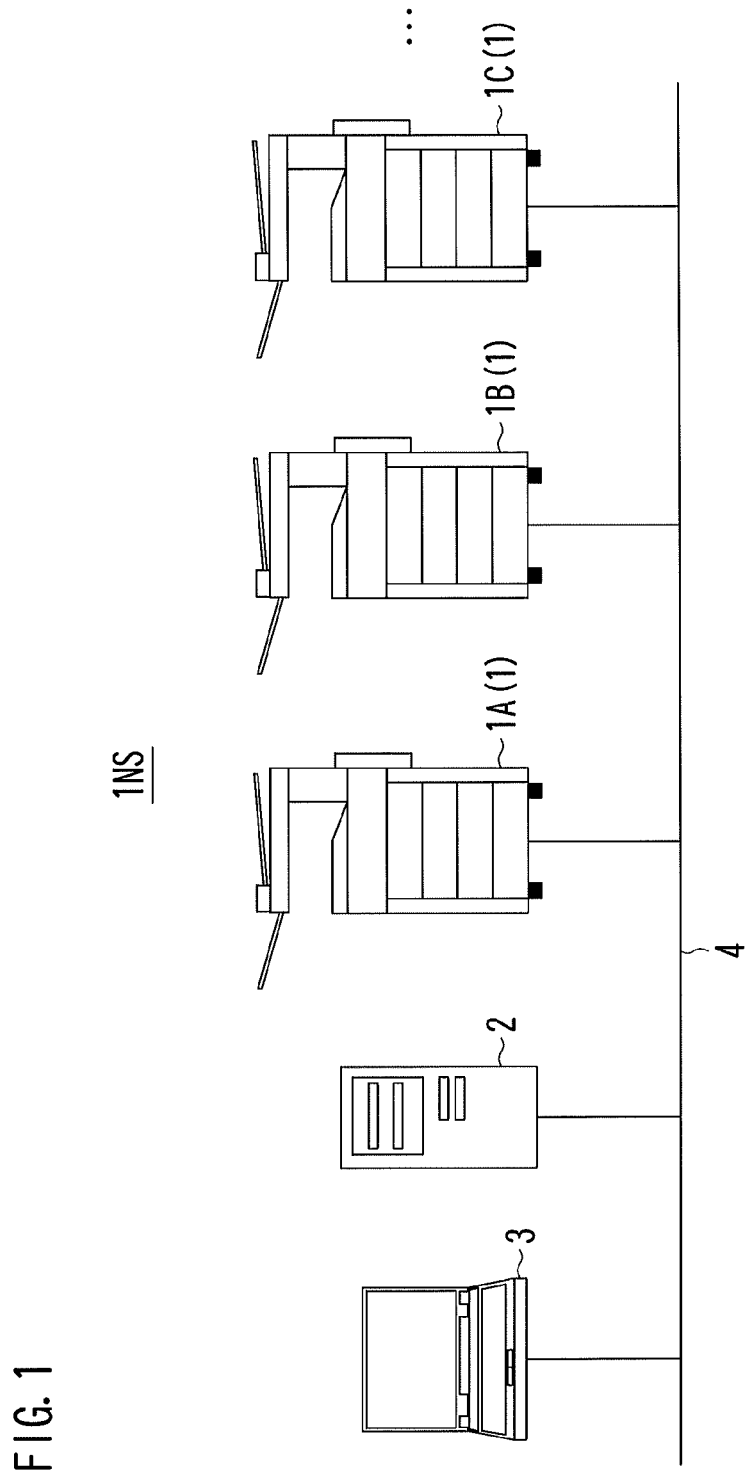
FIG. 1 is a diagram showing an example of the overall configuration of a network system.
Figure 2:
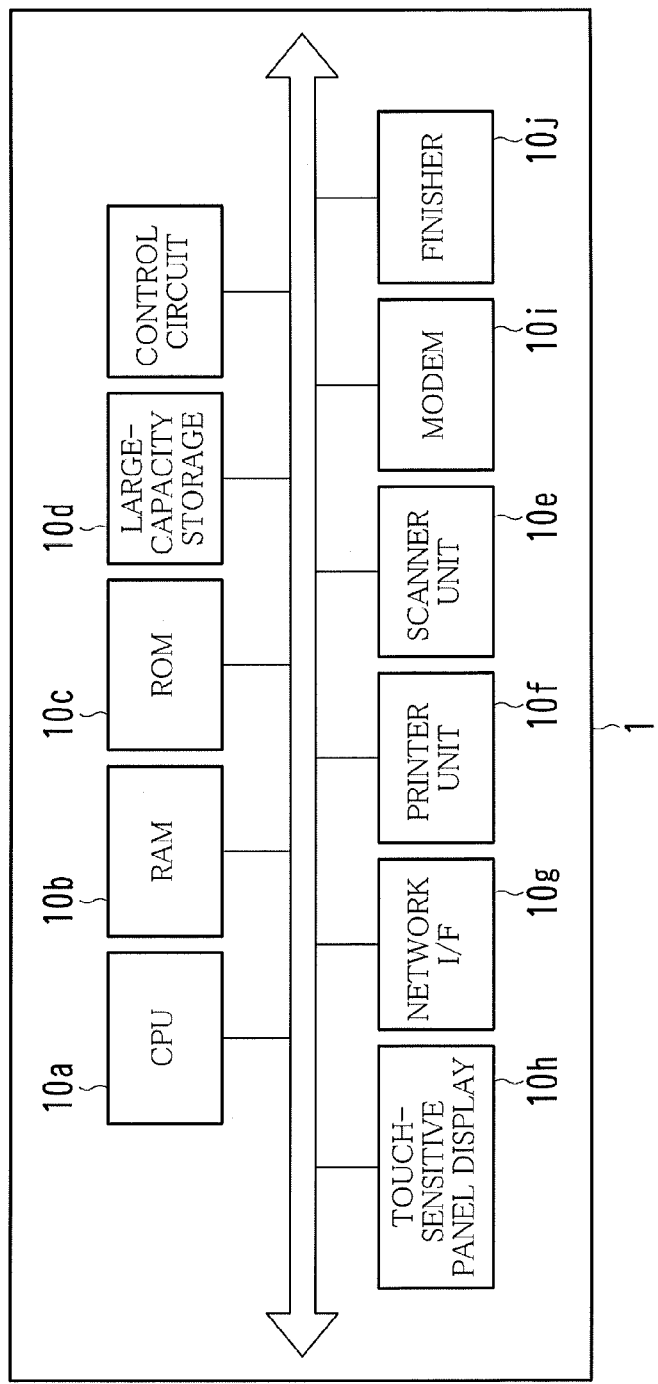
FIG. 2 is a diagram showing an example of the hardware configuration of an image forming apparatus.
Figure 3:
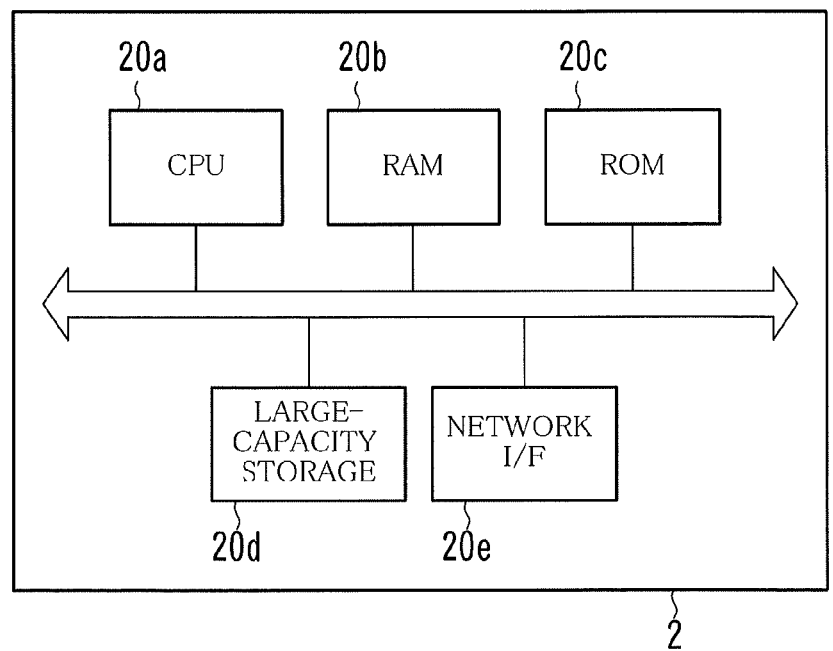
FIG. 3 is a diagram showing an example of the hardware configuration of a server.

FIG. 1 is a diagram showing an example of the overall configuration of a network system 1NS. FIG. 2 is a diagram showing an example of the hardware configuration of an image forming apparatus 1. FIG. 3 is a diagram showing an example of the hardware configuration of a server 2.

Referring to FIG. 1, the network system 1NS is configured of a plurality of image forming apparatuses 1, the server 2, a terminal 3, a communication line 4, and so on. Examples of the communication line 4 are a so-called Local Area Network (LAN), a public line, and the Internet. The image forming apparatuses 1, the server 2, and the terminal 3 are connected to one another via the communication line 4. Hereinafter, the image forming apparatuses 1 may be described separately as an "image forming apparatus 1A", an "image forming apparatus 1B", an "image forming apparatus 1C", and so on.

The network system 1NS is used by members of organizations such as corporations or public offices. In short, the members of such organizations are users of the network system 1NS. Each of the users is given a unique user code. Further, a password is set for each of the users and the password is only known by the user and kept secret from those not allowed access.

The image forming apparatus 1 is an apparatus that is generally called a "multifunction device" or a "Multi-Functional Peripheral (MFP)". The image forming apparatus 1 is an apparatus in which various functions such as copying, faxing, scanning, network printing, and serving as a file server are consolidated.

The image forming apparatus 1 also has a pull printing function. According to the pull printing function, print data sent from a personal computer or the like is temporarily saved to a server named "pull printing server" instead of being received promptly by the image forming apparatus 1. The pull printing server is operable to receive print data from personal computers installed in different locations and to manage the print data collectively. Thereafter, when a user goes to the installation location of a certain image forming apparatus and performs predetermined operation thereon, the pull printing server sends print data to the image forming apparatus.

As shown in FIG. 2, the image forming apparatus 1 is configured of a Central Processing Unit (CPU) 10a, a Random Access Memory (RAM) 10b, a Read Only Memory (ROM) 10c, a large-capacity storage 10d, a scanner unit 10e, a printer unit 10f, a network interface 10g, a touch-sensitive panel display 10h, a modem 10i, a finisher 10j, a control circuit, and the like. Some of the image forming apparatuses 1 are not equipped with the finisher 10j.

The network interface 10g performs communication with the terminal 3 and the like according to Transmission Control Protocol/Internet Protocol (TCP/IP) via the communication line 4. An example of the network interface log is a Network Interface Card (NIC).

The touch-sensitive panel display 10h displays, for example, a screen for presenting messages or instructions to a user, a screen for allowing a user to input processing commands and conditions, and a screen showing the results of processing performed by the CPU 10a. The touch-sensitive panel display 10h also detects a position touched by user's finger, and transmits a signal indicating the detection result to the CPU 10a.

The scanner unit 10e serves to read out an image such as photographs, characters, pictures, charts, and the like that are recorded on a sheet of paper, and to generate image data thereof.

The modem 10i is a device to send and receive image data, based on a protocol such as G3, with fax terminals via a fixed telephone network.

The printer unit 10f prints an image read out by the scanner unit 10e and an image indicated in image data sent by the terminal 3 or a fax terminal.

The finisher 10j serves to apply a finish to a printed matter having an image formed by the printer unit 10f. The finisher 10j performs, for example, a process for stapling such a printed matter, and a process for punching a hole therein.

The ROM 10c or the large-capacity storage 10d stores, therein, software 1SW for pull printing. Modules configuring the software 1SW (see FIG. 10) are loaded into the RAM 10b as needed and executed by the CPU 10a. The large-capacity storage 10d can be a Hard Disk Drive (HDD), a Solid State Drive (SSD), or the like.

Referring back to FIG. 1, the server 2 functions as a pull printing server. The server 2 receives print data from a personal computer and the like and stores the print data. The server 2 also delivers the print data to the image forming apparatus 1 in response to a request therefrom.

Referring to FIG. 3, the server 2 is configured of a CPU 20a, a RAM 20b, a ROM 20c, a large-capacity storage 20d, a network interface 20e, and so on.

The network interface 20e is an NIC for performing communication with the image forming apparatuses 1, the terminal 3, and so on.

The ROM 20c or the large-capacity storage 20d stores, therein, software 2SW for pull printing. Modules configuring the software 2SW (see FIG. 11) are loaded into the RAM 20b as needed and executed by the CPU 20a. The large-capacity storage 20d can be an HDD, an SSD, or the like.

The terminal 3 is a client to receive service, e.g., print service, from the image forming apparatus 1. The terminal 3 has installed, therein, a driver for allowing the image forming apparatus 1 and the server 2 to perform pull printing. The terminal 3 can be a personal computer, a Smartphone, a Personal Digital Assistant (PDA), or the like.

Pull printing processes by the image forming apparatus 1 and the server 2 are implemented by the software 1SW and the software 2SW, respectively. The software 1SW and the software 2SW are detailed later. The following is a description of the outline of processing by the image forming apparatus 1 and the server 2, and a description of the outline of operation by a user, with reference to sequence diagrams and so on.

[Registering Print Job Ticket]

Figure 4:
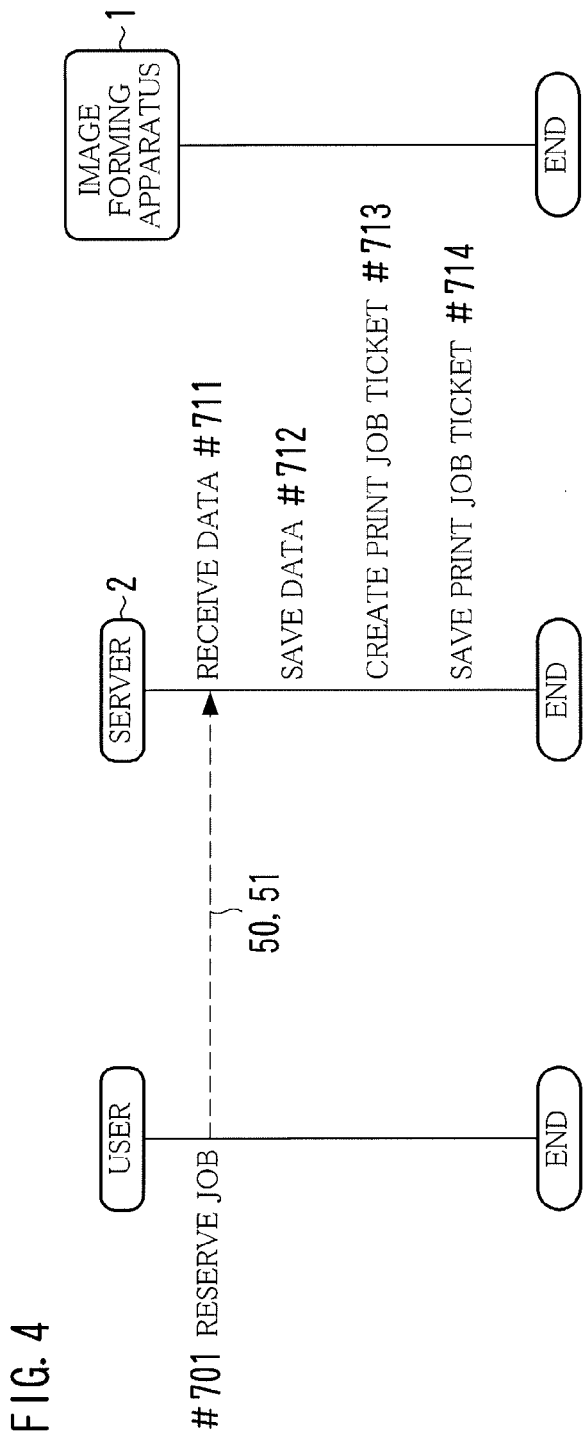
FIG. 4 is a sequence diagram depicting an example of the flow of processing for job ticket registration.

FIG. 4 is a sequence diagram depicting an example of the flow of processing for registering a job ticket.

The server 2 manages print jobs to be executed by the image forming apparatus 1 by issuing a job ticket for each print job. A job ticket for a print job is registered in the server 2 according to the procedural steps shown in FIG. 4.

A user prepares, in the terminal 3, image data on an image to be printed. The image data can be prepared by using an application such as word processing software or rendering software to create an image. Alternatively, web page data may be downloaded from a web site on the Internet, and the web page data may be used as the image data.

The user specifies printing conditions (color/monochrome, the set of prints, paper size, to staple or not to staple, etc.) for a print job, and then enters a print command into the terminal 3. At this time, the user selects printing based on the pull printing function. The user further selects a user code of a user who is allowed to use the print job.

In response to the operation, the terminal 3 creates print data 50 by, for example, converting the image data into data for Page Description Language (PDL) by the driver. The terminal 3 then sends, to the server 2, the print data 50 together with attribute data 51 containing the user code and the printing conditions specified by the user (Step #701 of FIG. 4). As a result, a request to reserve the print job is made to the server 2.

When receiving the print data 50 and the attribute data 51 (Step #711), the server 2 gives a unique data name to the print data 50 and a unique data name to the attribute data 51, and saves the print data 50 and the attribute data 51 to predetermined storage locations (Step #712). The server 2 issues, to the print job, a job identification code for distinguishing the print job from other print jobs, creates job ticket data 52 containing the job identification code, the data name of the print data 50, and the data name of the attribute data 51 (Step #713), and saves the job ticket data 52 to a predetermined storage location (Step #714). In this way, the job ticket is completely registered with the server 2.

Another configuration is possible in which the user prepares image data and registers a job ticket by using the image forming apparatus 1 in place of the terminal 3. In such a case, the user can prepare image data by, for example, instructing the image forming apparatus 1 to scan paper on which an image is depicted. The image forming apparatus 1 performs the processing as described above with respect to the terminal 3, so that the print data 50 is created and sent to the server 2 together with the attribute data 51.

[Verifying User Before Pull Printing]

Figure 5:
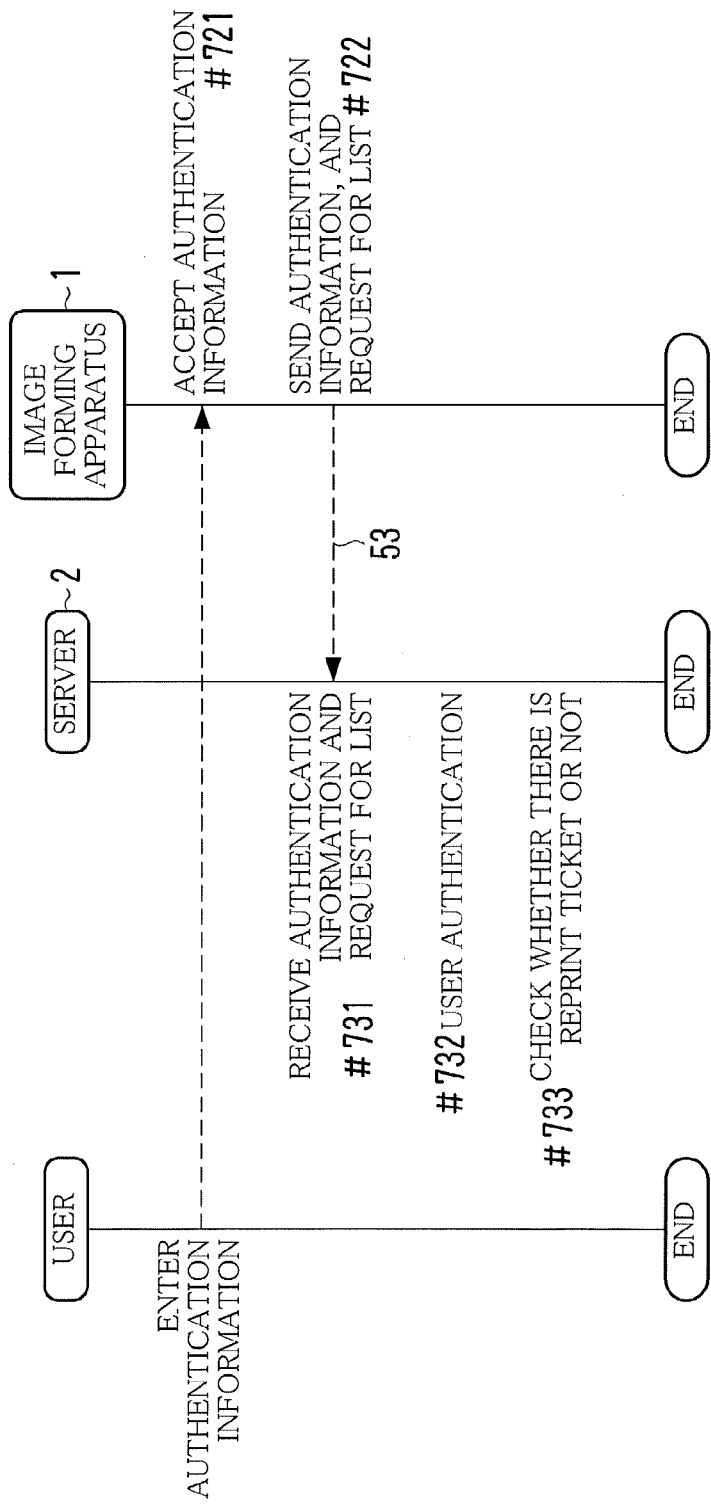
FIG. 5 is a sequence diagram depicting an example of the flow of processing for user authentication.

FIG. 5 is a sequence diagram depicting an example of the flow of processing for user authentication.

When the user needs to obtain a printed matter of the image after the job ticket is registered, he/she can go to the installation location of a certain image forming apparatus 1 to instruct the same to print the image. Before this, the user is required to be successfully authenticated by the server 2. The authentication processing is performed in accordance with the procedural steps shown in FIG. 5. The following description takes an example in which the user causes the image forming apparatus 1A to print the image.

The user enters his/her user code and password into the image forming apparatus 1A. When receiving the entry (Step #721 of FIG. 5), the image forming apparatus 1A sends, to the server 2, authentication request data 53 indicating the user code, the password, and a request for a print job list (Step #722).

When receiving the authentication request data 53 (Step #731), the server 2 checks the authenticity of the user based on the user code and the password indicated in the authentication request data 53, i.e., performs user authentication (Step #732).

When determining that the user is an authentic user, the server 2 permits the user to log onto the server 2, and checks whether or not the server 2 has data on a reprint ticket for the user (Step #733). The details of the subsequent processing are different depending on whether or not the server 2 has data on a reprint ticket for the user. The reprint ticket is described later. Hereinafter, a user who has logged onto the server 2 is sometimes referred to as a "login user".

[Registering Reprint Ticket]

Figure 6:
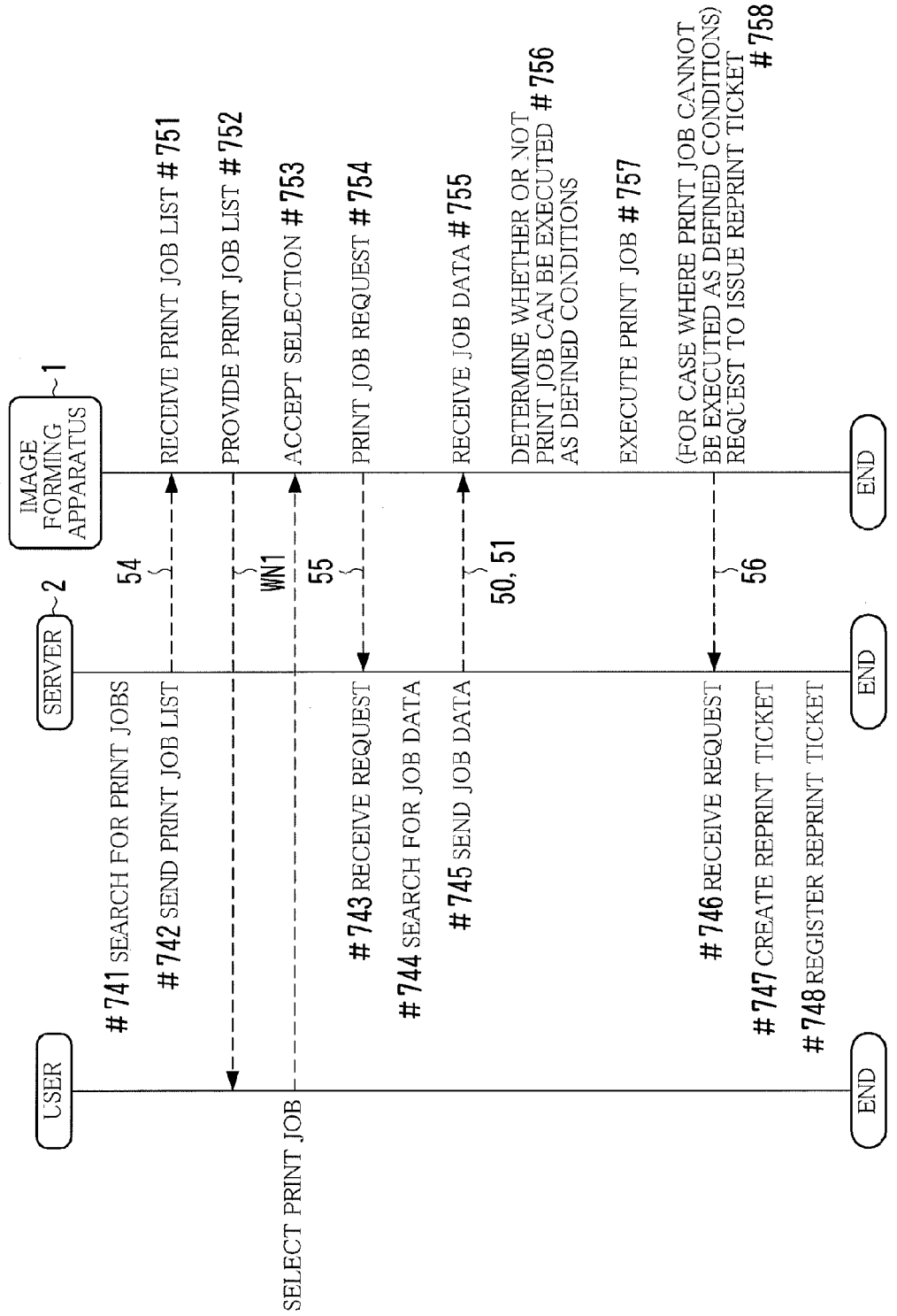
FIG. 6 is a sequence diagram depicting an example of the flow of processing for reprint ticket registration.
Figure 7:
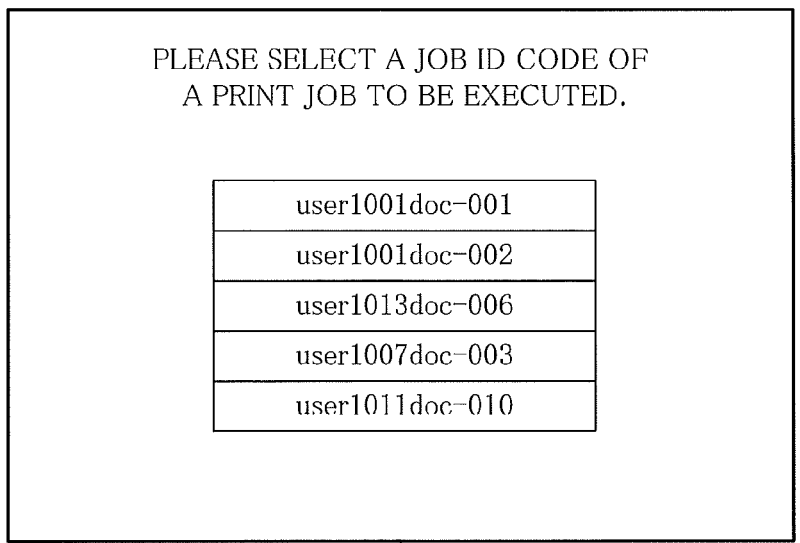
FIG. 7 is a diagram showing an example of a job list screen.

FIG. 6 is a sequence diagram depicting an example of the flow of processing for reprint ticket registration. FIG. 7 is a diagram showing an example of a job list screen WN1.

If the processing result in Step #733 of FIG. 5 shows that the server 2 does not have data on a reprint ticket for the login user, then the image forming apparatus 1A and the server 2 perform the processing according to the procedural steps of FIG. 6. At this time, data on a reprint ticket is sometimes generated.

The server 2 searches for print jobs that the login user is allowed to use (Step #741), and sends, to the image forming apparatus 1A, job list data 54 indicating a list of the print jobs found by the search (Step #742). The method for searching for print jobs is described later.

When receiving the job list data 54 (Step #751), the image forming apparatus 1A displays the job list screen WN1 showing job identification codes of the print jobs contained in the job list data 54 as shown in FIG. 7 (Step #752). The login user selects, on the job list screen WN1, a job identification code of a print job corresponding to the image to be printed.

Upon accepting the selection of the job identification code (Step #753), the image forming apparatus 1A sends, to the server 2, job request data 55 indicating the job identification code and a request for data on the print job (Step #754).

When receiving the job request data 55 (Step #743), the server 2 searches, based on the job request data 55, for print data 50 and attribute data 51 on the print job selected by the user (Step #744), and sends the print data 50 and attribute data 51 found by the search to the image forming apparatus 1A (Step #745). The method for searching for the print data 50 and the attribute data 51 is described later.

Upon the receipt of the print data 50 and the attribute data 51 (Step #755), the image forming apparatus 1A determines whether or not the image can be printed as defined in the printing conditions (Step #756). The determination method is described later.

The image forming apparatus 1A prints the image onto paper based on the print data 50 and the attribute data 51, and applies a finish to the printed matter if necessary (Step #757). In short, the image forming apparatus 1A executes the print job. If the printing or the finishing process as defined in the printing conditions is impossible, then the printing conditions are changed to execute the print job. The detailed descriptions are given later.

If the printing as defined in the printing conditions is impossible, then the image forming apparatus 1A also sends, to the server 2, issuance request data 56 containing the user code of the login user and the job identification code of the print job to request the server 2 to issue a reprint ticket (Step #758).

The "reprint ticket" herein is a job ticket that enables a user, who could not cause a certain image forming apparatus 1 to execute a print job as defined in the printing conditions, to cause another image forming apparatus 1 to execute the print job more easily than is conventionally possible. Descriptions as to how to use the reprint ticket are given later.

When receiving the issuance request data 56 (Step #746), the server 2 creates reprint ticket data 57 (Step #747) and saves the reprint ticket data 57 to a predetermined storage location (Step #748). As a result, the reprint ticket is completely registered.

The reprint ticket data 57 indicates the user code and the job identification code that are contained in the issuance request data 56, and the printing conditions for the print job. The method for creating the reprint ticket data 57 is described later. The reprint ticket data 57 is desirably encrypted. In particular, the password section thereof is desirably encrypted.

[Executing Print Job Based on Reprint Ticket]

Figure 8:
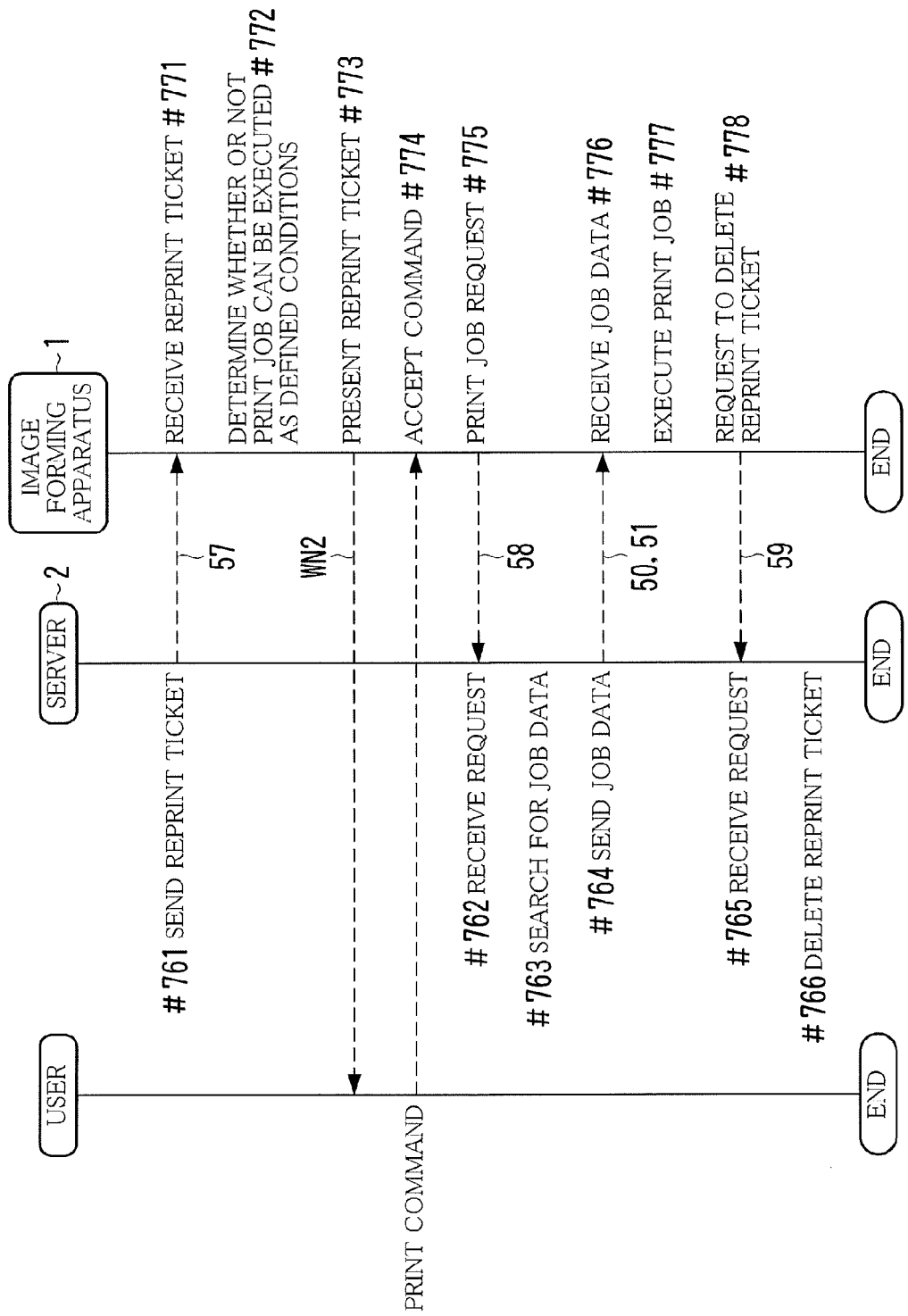
FIG. 8 is a sequence diagram depicting an example of the flow of processing performed when a print job is executed based on a reprint ticket.
Figure 9:
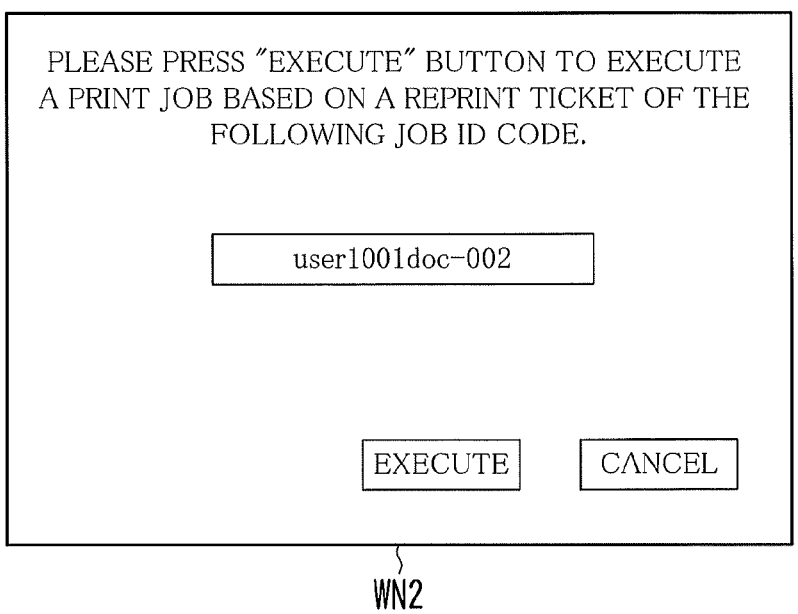
FIG. 9 is a diagram showing an example of a reprint ticket screen.

FIG. 8 is a sequence diagram depicting an example of the flow of processing performed when a print job is executed based on a reprint ticket. FIG. 9 is a diagram showing an example of a reprint ticket screen WN2.

In the case where the user could not cause a certain image forming apparatus 1 to execute a print job as defined in the printing conditions, he/she can use a reprint ticket to cause another image forming apparatus 1 to execute the print job. The following is a description of an example in which the user uses a reprint ticket to cause the image forming apparatus 1B to execute a print job.

The user operates the image forming apparatus 1B to log onto the server 2. The operation by the user and the processing by the image forming apparatus 1B and the server 2 are the same as those described earlier with reference to FIG. 5.

If the processing result in Step #733 of FIG. 5 shows that the server 2 has data on a reprint ticket, i.e., the reprint ticket data 57, for the login user, then the image forming apparatus 1B and the server 2 perform the processing according to the procedural steps of FIG. 8.

The server 2 sends the reprint ticket data 57 to the image forming apparatus 1B (Step #761 of FIG. 8).

In response to receiving the reprint ticket data 57 (Step #771), the image forming apparatus 1B determines whether or not the image can be printed as defined in the printing conditions (Step #772). The determination method is described later.

If the image can be printed as defined in the printing conditions, then the image forming apparatus 1B displays the reprint ticket screen WN2 showing a job identification code contained in the reprint ticket data 57 as shown in FIG. 9 (Step #773). While being not shown in FIG. 9, the details of print settings may be displayed.

The user determines, on the reprint ticket screen WN2, whether or not a print job corresponding to the job identification code is executed. If the user desires the print job to be executed, then he/she presses an "execute" button to give a command to execute the print job to the image forming apparatus 1B. At this time, if a printed matter already obtained by the user is acceptable while not satisfying the printing conditions specified by him/her, he/she may not give the command to execute the print job.

When receiving the command to execute the print job (Step #774), the image forming apparatus 1B sends, to the server 2, job request data 58 indicating the job identification code and a request for data on the print job (Step #775).

When receiving the job request data 58 (Step #762), the server 2 searches for print data 50 and attribute data 51 based on the job request data 58 (Step #763), and sends the print data 50 and the attribute data 51 found by the search to the image forming apparatus 1B (Step #764). The method for searching for the print data 50 and the attribute data 51 is described later.

Upon the receipt of the print data 50 and the attribute data 51 (Step #776), the image forming apparatus 1B prints the image onto paper based on the print data 50 and the attribute data 51, and applies a finish to the printed matter if necessary (Step #777). In short, the image forming apparatus 1B executes a print job corresponding to the reprint ticket.

After executing the print job, the image forming apparatus 1B sends, to the server 2, deletion command data 59 indicating the job identification code of the print job and a command to delete the data on the print job (Step #778).

In response to receiving the deletion command data 59 (Step #765), the server 2 deletes the print data 50 and the attribute data 51 based on the deletion command data 59 (Step #766). The deletion method is described later.

[Software 1SW and 2SW]

Figure 10:
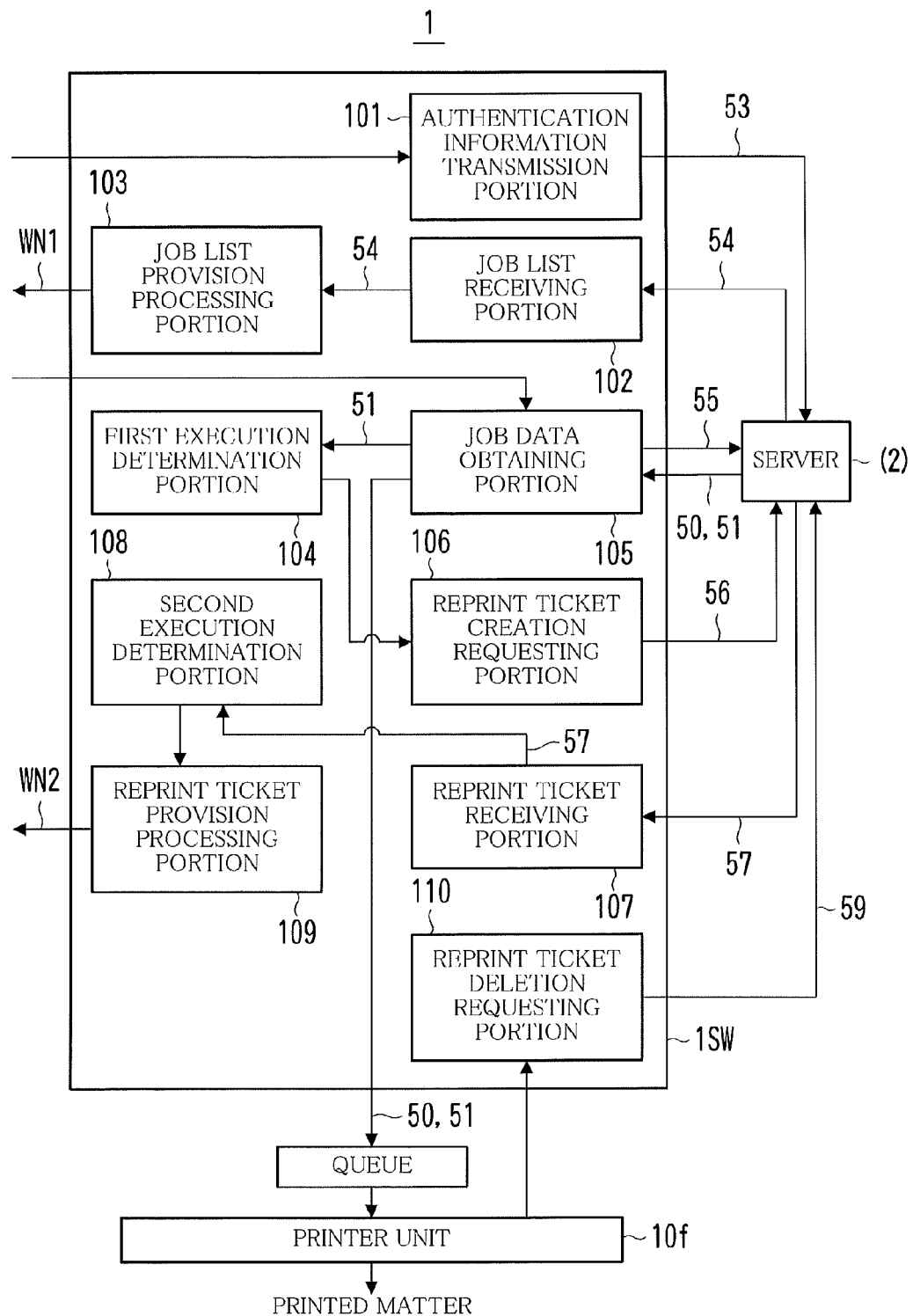
FIG. 10 is a diagram showing an example of the functional configuration of an image forming apparatus.
Figure 11:
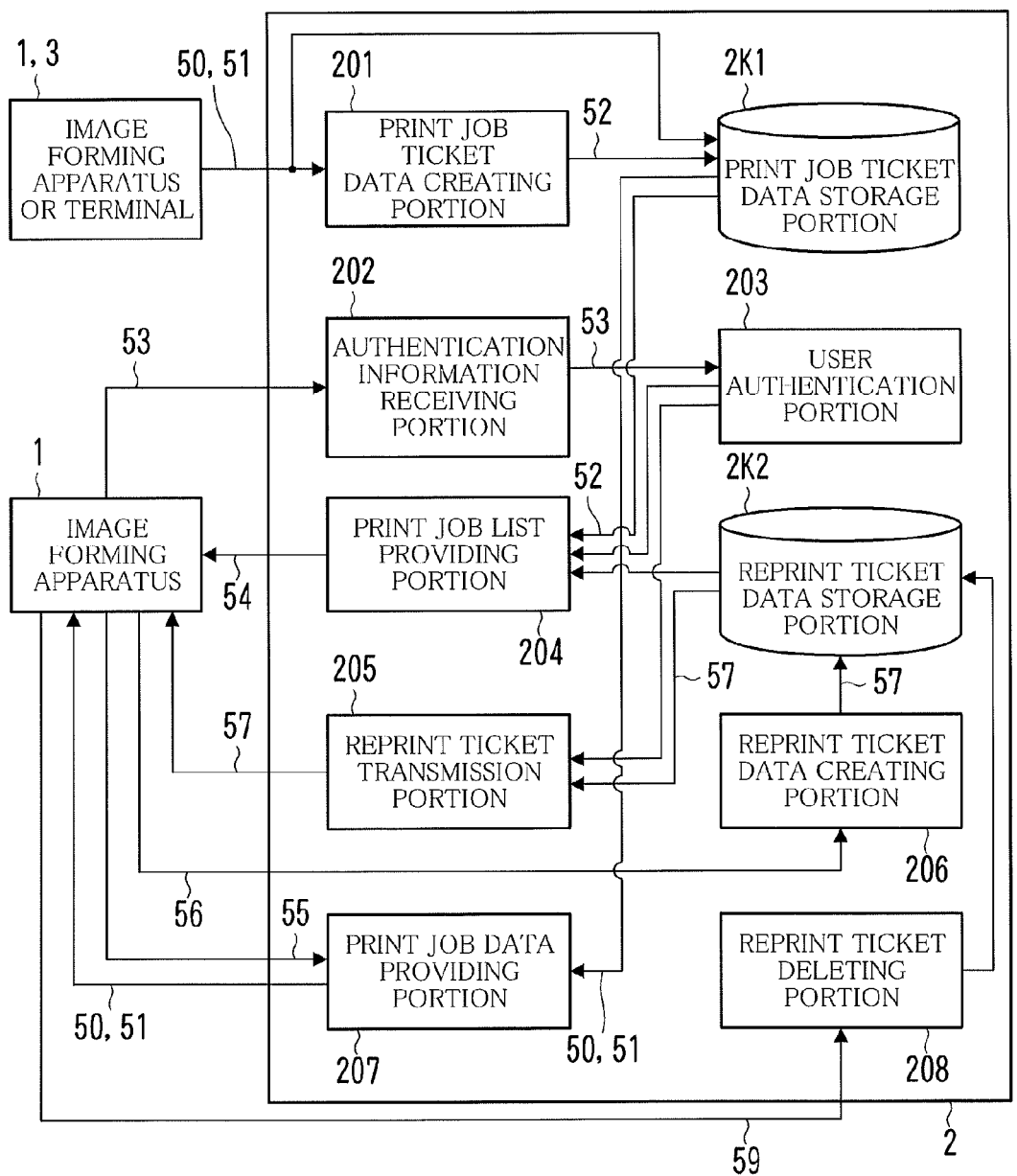
FIG. 11 is a diagram showing an example of the functional configuration of a server.

FIG. 10 is a diagram showing an example of the functional configuration of the image forming apparatus 1. FIG. 11 is a diagram showing an example of the functional configuration of the server 2. FIG. 12 is a diagram showing an example of the reprint ticket screen WN2.

The software 1SW is software for implementing the functional elements shown in FIG. 10, i.e., an authentication information transmission portion 101, a job list receiving portion 102, a job list provision processing portion 103, a first execution determination portion 104, a job data obtaining portion 105, a reprint ticket creation requesting portion 106, a reprint ticket receiving portion 107, a second execution determination portion 108, a reprint ticket provision processing portion 109, a reprint ticket deletion requesting portion 110, and so on.

The software 2SW is software for implementing the functional elements shown in FIG. 11, i.e., a print job ticket data creating portion 201, an authentication information receiving portion 202, a user authentication portion 203, a print job list providing portion 204, a reprint ticket transmission portion 205, a reprint ticket data creating portion 206, a print job data providing portion 207, a reprint ticket deleting portion 208, a print job ticket data storage portion 2K1, a reprint ticket data storage portion 2K2, and so on.

The processing described earlier with reference to FIGS. 4, 5, 6, and 8 is executed by the CPU 10a and the CPU 20a based on the software 1SW and the software 2SW. Hereinafter, the individual functional elements of FIGS. 10 and 11 are described.

As described earlier, a user prepares image data and specifies printing conditions. The user also determines who (which user) is authorized to give a command to execute a print job based on the image data, and selects a user code of the user determined.

In response to this operation, the image forming apparatus 1 or the terminal 3 creates print data 50 and attribute data 51 based on the image data and the details selected by the user, and sends the print data 50 and the attribute data 51 to the server 2.

With the server 2, the print job ticket data storage portion 2K1 (see FIG. 11) contains, therein, a print data folder, an attribute data folder, and a job ticket folder and stores data relating to print jobs.

The print data 50 is given a unique data name and saved to the print data folder. The attribute data 51 is given a unique data name and saved to the attribute data folder.

The print job ticket data creating portion 201 creates job ticket data 52. The job ticket data 52 contains a job identification code of the print job, the data name of the print data 50, and the data name of the attribute data 51. The job ticket data 52 is saved to the job ticket folder.

The processing described above is performed, so that the job ticket for the print job is completely registered. The user can use the job ticket to cause a certain image forming apparatus 1 to execute the print job.

The user goes to the installation location of an image forming apparatus 1 that he/she desires to use to execute the print job. The user operates the image forming apparatus 1 to enter his/her user code and password.

In response to this operation, the authentication information transmission portion 101 (see FIG. 10) of the image forming apparatus 1 generates authentication request data 53 and sends the same to the server 2. The authentication request data 53 contains the user code and password entered by the user and a request for a print job list.

With the server 2, the authentication information receiving portion 202 receives the authentication request data 53 from the image forming apparatus 1.

The user authentication portion 203 has a user account database in which user codes and passwords are stored in advance for members of an organization, i.e., on a user-by-user basis. When the authentication information receiving portion 202 receives the authentication request data 53, the user authentication portion 203 checks the authenticity of the user operating the image forming apparatus 1 by matching the user code and password contained in the authentication request data 53 against user codes and passwords stored in the user account database. In short, the user authentication portion 203 performs user authentication.

If the user authentication portion 203 determines that the user is an authentic user, then the logon operation into the server by the user is completed.

In response, one of the print job list providing portion 204 and the reprint ticket transmission portion 205 performs processing in the following manner.

If there is no reprint ticket of the login user, then the print job list providing portion 204 searches for print jobs that the login user is authorized to give an execution command, and sends job list data 54 showing a list of the print jobs found by the search to the image forming apparatus 1 operated by the login user.

In the meantime, whether or not there is a reprint ticket of a login user can be checked in the following manner. As described above, the reprint ticket is stored in the form of reprint ticket data 57 into a predetermined storage location. The reprint ticket data 57 contains, at least, a user code.

The print job list providing portion 204 searches, in the predetermined storage location, for reprint ticket data 57 indicating the user code of the login user. Thereby, the print job list providing portion 204 checks whether or not there is a reprint ticket of the login user. The predetermined storage location is the reprint ticket data storage portion 2K2 which is described later.

The print jobs that the login user is authorized to give a command to execute can be searched for as follows. As discussed above, a print job is stored in the print job ticket data storage portion 2K1 in the form of job ticket data 52. The job ticket data 52 contains, at least, a user code of a user authorized to give an execution command.

The print job list providing portion 204 searches, in the print job ticket data storage portion 2K1, for job ticket data 52 indicating the user code of the login user, so that print jobs that the login user is authorized to give a command to execute are found out. The print job list providing portion 204 then creates, as the job list data 54, data indicating the job identification codes contained in the sets of job ticket data 52 thus found out. The print job list providing portion 204 sends the job list data 54 to the image forming apparatus 1 operated by the login user.

On the other hand, if there is a reprint ticket of the login user, then the reprint ticket transmission portion 205 sends the reprint ticket to the image forming apparatus 1. To be specific, the reprint ticket transmission portion 205 searches, in the reprint ticket data storage portion 2K2, for reprint ticket data 57 indicating the user code of the login user, and sends the reprint ticket data 57 to the image forming apparatus 1 operated by the login user. If a plurality of sets of the reprint ticket data 57 are found out by the search, then, the reprint ticket transmission portion 205 sends all the sets of the reprint ticket data 57 to the image forming apparatus 1.

In the image forming apparatus 1, the job list receiving portion 102 receives the job list data 54 from the server 2.

The job list provision processing portion 103 displays the job list screen WN1 on the touch-sensitive panel display 10h. As shown in FIG. 7, the job list screen WN1 shows a list of the job identification codes contained in the received job list data 54.

The login user selects, on the job list screen WN1, a job identification code of the print job to be executed from the list.

The job data obtaining portion 105 downloads, from the server 2, print data 50 and attribute data 51 corresponding to the selected print job. To be specific, the job data obtaining portion 105 sends, to the server 2, job request data 55 containing a job identification code of the selected print job and a request for data on the selected print job.

In the server 2, when receiving the job request data 55, the print job data providing portion 207 searches for print data 50 and attribute data 51 corresponding to the job identification code contained in the job request data 55, and sends the print data 50 and the attribute data 51 found out by the search to the image forming apparatus 1 that is the transmission source of the job request data 55. The print data 50 and the attribute data 51 can be found out in the following manner.

The print job data providing portion 207 searches, in the print job ticket data storage portion 2K1, job ticket data 52 indicating the job identification code contained in the job request data 55. As described earlier, the job ticket data 52 indicates the data name of the print data 50 and the data name of the attribute data 51. Thus, the print job data providing portion 207 searches, in the print data folder and the attribute data folder respectively, for print data 50 indicating the corresponding data name and attribute data 51 indicating the corresponding data name.

When the image forming apparatus 1 downloads the print data 50 and the attribute data 51, a print job is registered in a queue as per the conventional art. When the print job takes its turn, the printer unit 10f executes the print job based on the print data 50 and the attribute data 51.

However, if a print job cannot be executed in accordance with the printing conditions defined in the attribute data 51, then the printing conditions are changed to execute the print job. For example, when the image forming apparatus 1 is not equipped with a color printing function in spite of the fact that conditions for color printing are specified, the conditions are changed from color printing to monochrome printing to execute the print job. Alternatively, when the image forming apparatus 1 is not equipped with the finisher 10j in spite of the fact that conditions for stapling are specified, the print job is executed with stapling omitted.

When the print data 50 and the attribute data 51 are downloaded, the first execution determination portion 104 and the reprint ticket creation requesting portion 106 perform the following processing in parallel with the execution of the print job or before or after the same.

The first execution determination portion 104 determines whether or not the print job can be executed according to the printing conditions defined in the attribute data 51. The determination may be made by comparing the printing conditions defined in the attribute data 51 with the specifications of the image forming apparatus 1. Alternatively, the first execution determination portion 104 may determine that the print job cannot be executed for a case where the image forming apparatus 1 is out of consumables such as toner or paper.

If the first execution determination portion 104 determines that the print job cannot be executed according to the printing conditions, then the reprint ticket creation requesting portion 106 sends, to the server 2, the issuance request data 56 indicating the job identification code of the print job and the user code of the login user, and requests the server 2 to issue a reprint ticket.

In the server 2, when receiving the issuance request data 56, the reprint ticket data creating portion 206 creates reprint ticket data 57 and stores the same into the reprint ticket data storage portion 2K2.

The reprint ticket data 57 is created in the following manner. The reprint ticket data creating portion 206 searches, in the job ticket folder of the print job ticket data storage portion 2K1, for job ticket data 52 indicating the job identification code contained in the issuance request data 56. The reprint ticket data creating portion 206 also searches, in the attribute data folder of the print job ticket data storage portion 2K1, for attribute data 51 corresponding to the data name contained in the job ticket data 52.

The reprint ticket data creating portion 206 then generates the reprint ticket data 57 indicating the user code and the job identification code contained in the received issuance request data 56 and the printing conditions indicated in the attribute data 51.

When the server 2 sends, to the image forming apparatus 1, the reprint ticket data 57 instead of the job list data 54 at the time of logon, the reprint ticket receiving portion 107 of the image forming apparatus 1 receives the reprint ticket data 57.

The second execution determination portion 108 determines whether or not the print job can be executed according to the printing conditions defined in the reprint ticket data 57. As with the determination by the first execution determination portion 104, the determination by the second execution determination portion 108 may be made by comparing the printing conditions defined in the reprint ticket data 57 with the specifications of the image forming apparatus 1, or, alternatively, may be made based on the amount of consumables.

The reprint ticket provision processing portion 109 displays the reprint ticket screen WN2 on the touch-sensitive panel display 10h. As shown in FIG. 9, the reprint ticket screen WN2 shows a job identification code of the print job that is determined, by the second execution determination portion 108, to be executable according to the printing conditions among the job identification codes contained in the reprint ticket data 57 received by the reprint ticket receiving portion 107.

When desiring to execute the print job corresponding to the job identification code, the login user presses an "execute" button on the reprint ticket screen WN2.

In response to the "execute" button pressed, the job data obtaining portion 105 sends, to the server 2, job request data 58 indicating the job identification code and a request for data on the print job. Then, as described earlier, the print data 50 and the attribute data 51 for the print job is downloaded from the server 2 to the image forming apparatus 1, and the print job is registered in a queue. Then, when the print job takes its turn, the printer unit 10f executes the print job.

If the reprint ticket receiving portion 107 receives a plurality of sets of reprint ticket data 57 at one time, the second execution determination portion 108 determines whether or not it is possible to execute, in accordance with the printing conditions, each of the print jobs corresponding to the job identification codes contained in the sets of reprint ticket data 57. The reprint ticket provision processing portion 109 preferably displays a list, as shown in FIG. 12, of job identification codes of print jobs determined to be executable by the second execution determination portion 108. The job data obtaining portion 105 preferably downloads, from the server 2, print data 50 and attribute data 51 of the print job selected from among the list of job identification codes by the login user.

After the completion of the print job corresponding to the print data 50 and the attribute data 51 obtained based on the reprint ticket, the reprint ticket deletion requesting portion 110 sends, to the server 2, deletion command data 59 indicating the job identification code of the print job and a command to delete data on the print job.

In the server 2, when receiving the deletion command data 59, the reprint ticket deleting portion 208 searches, in the reprint ticket data storage portion 2K2, for reprint ticket data 57 containing the job identification code indicated in the deletion command data 59, and deletes the reprint ticket data 57 found out by the search.

Figure 13:
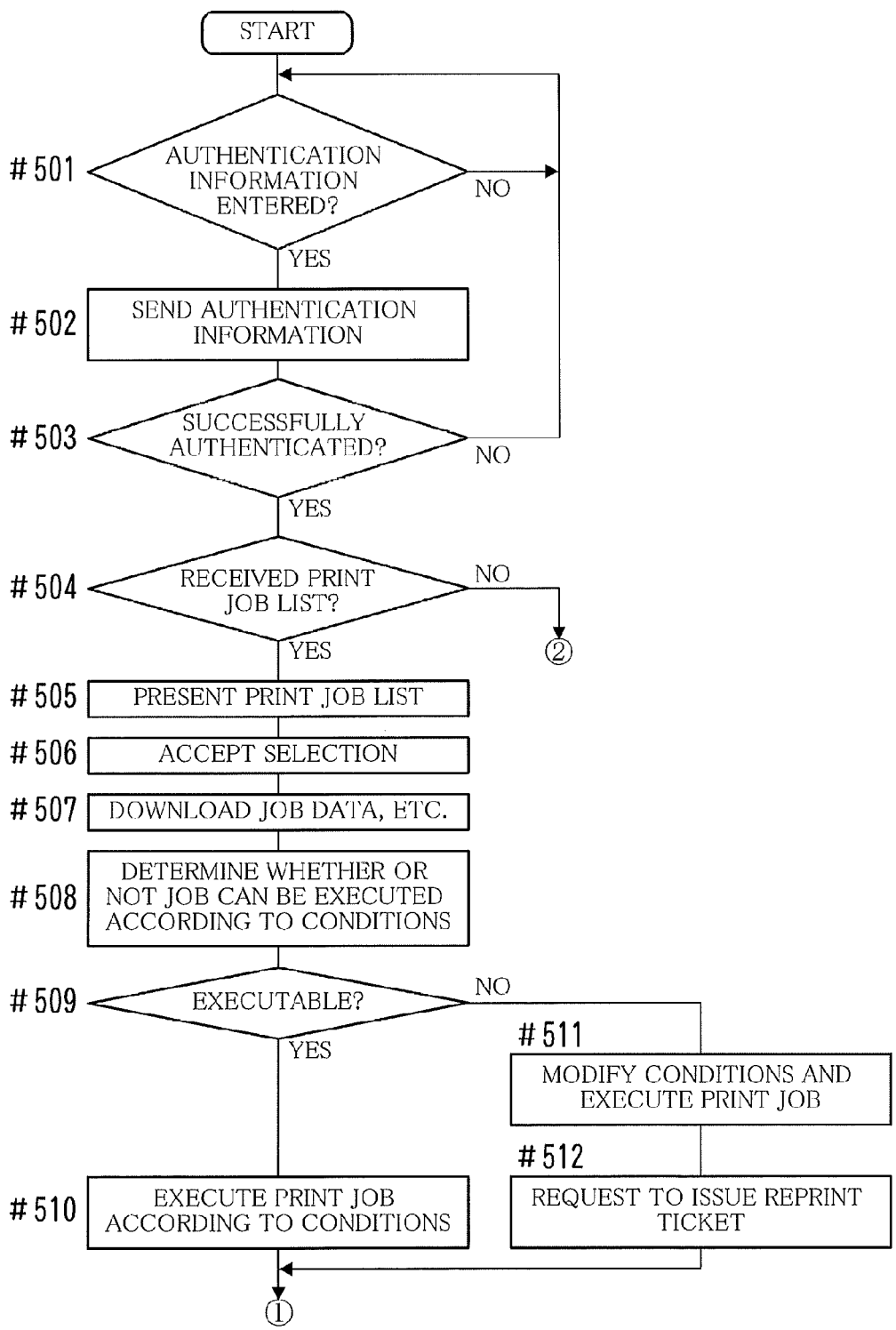
FIG. 13 is a flowchart depicting an example of the flow of overall processing performed by an image forming apparatus according to a first embodiment.
Figure 14:
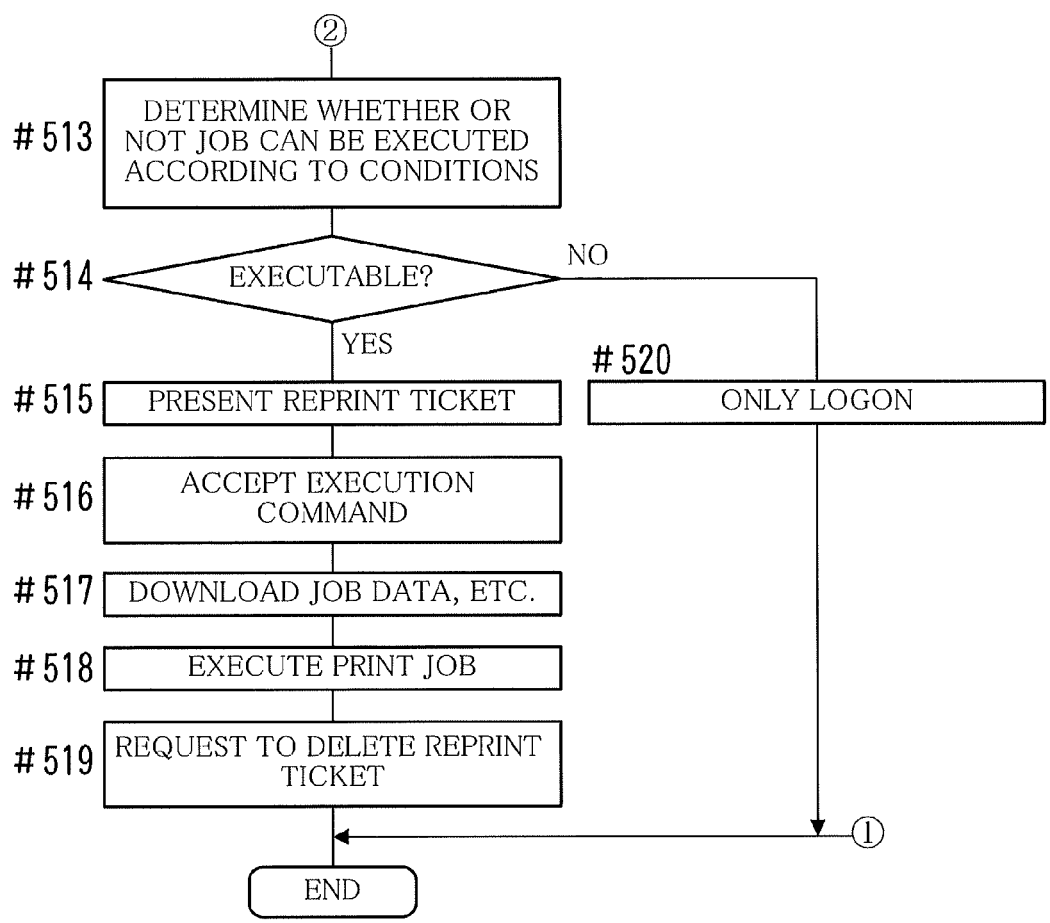
FIG. 14 is a flowchart depicting an example of the flow of overall processing performed by an image forming apparatus according to the first embodiment.
Figure 15:
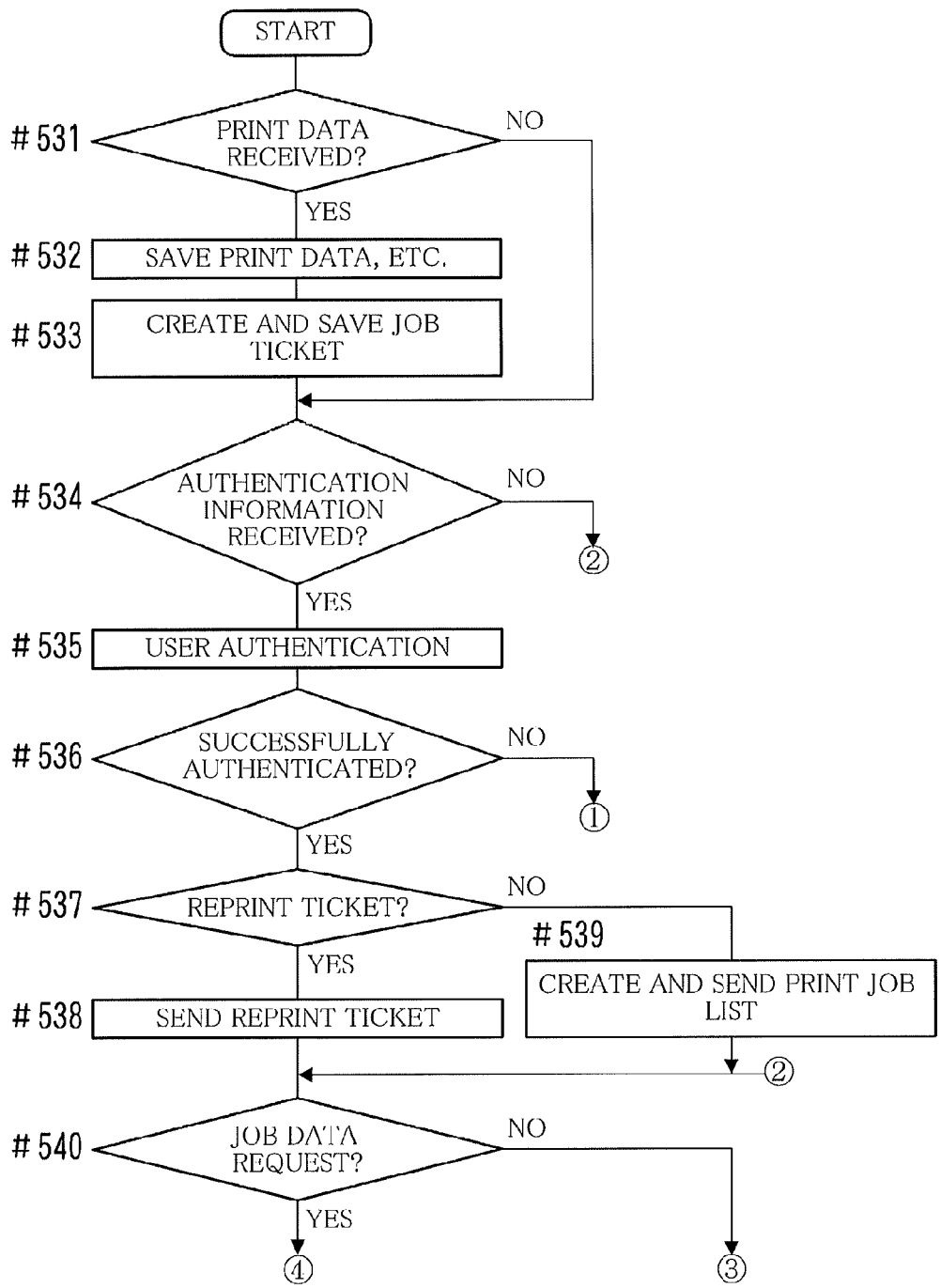
FIG. 15 is a flowchart depicting an example of the flow of overall processing performed by a server according to the first embodiment.
Figure 16:
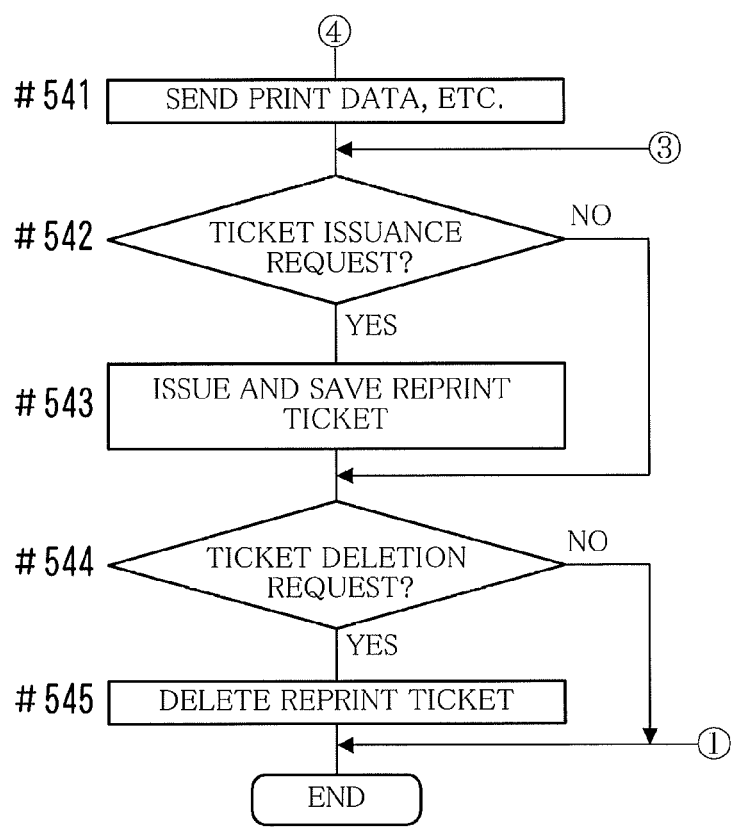
FIG. 16 is a flowchart depicting an example of the flow of overall processing performed by a server according to the first embodiment.

FIGS. 13 and 14 are flowcharts depicting an example of the flow of overall processing performed by the image forming apparatus 1 according to the first embodiment. FIGS. 15 and 16 are flowcharts depicting an example of the flow of overall processing performed by the server 2 according to the first embodiment.

Given below is a description of the flow of overall processing performed by the image forming apparatus 1 and the server 2 with reference to the flowcharts of FIGS. 13-16.

Every time a user enters data or data is sent by the server 2, the image forming apparatus 1 performs the processing shown in FIGS. 13 and 14 appropriately.

When the user enters a user code and a password (Yes in Step #501 of FIG. 13), the image forming apparatus 1 sends authentication request data 53 indicating the user code, the password, and so on to the server 2 (Step #502). Thereby, a request for user authentication and a request for list, etc. are made to the server 2.

When the user is successfully authenticated (Yes in Step #503), the server 2 sends either the job list data 54 or the reprint ticket data 57 to the image forming apparatus 1.

If receiving the job list data 54 (Yes in Step #504), then the image forming apparatus 1 displays the job list screen WN1 (see FIG. 7) based on the job list data 54 to present print jobs that the login user is authorized to give a command to execute (Step #505).

When the login user selects a print job and the image forming apparatus 1 accepts the selection (Step #506), the image forming apparatus 1 downloads print data 50 and attribute data 51 on the print job from the server 2 (Step #507). At this time, the image forming apparatus 1 sends job request data 55 indicating the job identification code of the print job and so on to the server 2.

Upon downloading the print data 50 and the attribute data 51, the image forming apparatus 1 determines whether or not the print job can be executed according to printing conditions indicated in the attribute data 51 (Step #508).

If determining that the print job can be executed according to the printing conditions (Yes in Step #509), then the image forming apparatus 1 uses the print data 50 and the attribute data 51 to execute the print job according to the printing conditions (Step #510).

Otherwise (No in Step #509), the printing conditions are modified to execute the print job (Step #511). Further, the image forming apparatus 1 sends, to the server 2, issuance request data 56 indicating the job identification code of the print job, the user code of the login user, and so on (Step #512). Thereby, a request to issue a reprint ticket of the print job is made to the server 2.

On the other hand, if receiving not the job list data 54 but the reprint ticket data 57 (No in Step #504), then the image forming apparatus 1 determines whether or not the print job can be executed according to printing conditions indicated in the reprint ticket data 57 (Step #513 of FIG. 14).

If determining that the print job can be executed according to the printing conditions (Yes in Step #514), then the image forming apparatus 1 displays the reprint ticket screen WN2 (see FIG. 9) based on the reprint ticket data 57 to present, to the login user, the print job that another image forming apparatus 1 could not execute according to the printing conditions (Step #515).

When receiving a command to execute the print job from the login user (Step #516), the image forming apparatus 1 downloads the print data 50 and the attribute data 51 from the server 2 (Step #517). At this time, the image forming apparatus 1 sends job request data 55 indicating the job identification code contained in the reprint ticket data 57 to the server 2. The image forming apparatus 1 then uses the print data 50 and the attribute data 51 to execute the print job according to the printing conditions (Step #518).

After executing the print job, the image forming apparatus 1 sends, to the server 2, deletion command data 59 indicating the job identification code of the print job, and so on (Step #519). Thus, a request to delete the reprint ticket corresponding to the print job is made to the server 2.

In the case where the image forming apparatus 1 verifies the user, and obtains neither the job list data 54 nor the reprint ticket data 57 corresponding to the print job determined to be executable according to the printing conditions (No in Step #504 and No in Step #514), the user is only allowed to log onto the server 2 (Step #520).

Every time data is sent by the image forming apparatus 1 or the terminal 3, the server 2 performs the processing shown in FIGS. 15 and 16 appropriately.

When receiving print data 50 and attribute data 51 from the image forming apparatus 1 or the terminal 3 (Yes in Step #531 of FIG. 15), the server 2 saves the print data 50 and the attribute data 51 to predetermined storage locations (Step #532). The server 2 then creates job ticket data 52 corresponding to the print data 50 and the attribute data 51 to save the job ticket data 52 to a predetermined storage location (Step #533).

In response to receiving authentication request data 53 from the image forming apparatus 1 (Yes in Step #534), the server 2 performs user authentication (Step #535). If determining that the user of the image forming apparatus 1 is an authentic user (Yes in Step #536), and if saving data on a reprint ticket, i.e., reprint ticket data 57, for the user (Yes in Step #537), then the server 2 sends the reprint ticket data 57 to the image forming apparatus 1 (Step #538). Otherwise (No in Step #537), the server 2 sends, to the image forming apparatus 1, job list data 54 indicating a list of print jobs that the login user is authorized to give a command to execute (Step #539).

In response to receiving job request data 55 from the image forming apparatus 1 (Yes in Step #540), the server 2 sends, to the image forming apparatus 1, print data 50 and attribute data 51 based on the job request data 55 (Step #541 of FIG. 16).

In response to receiving issuance request data 56 (Yes in Step #542), the server 2 creates reprint ticket data 57 and saves the same to a predetermined storage location (Step #543).

In response to receiving deletion command data 59 (Yes in Step #544), the server 2 deletes the reprint ticket data 57 based on the deletion command data 59 (Step #545).

[Second Embodiment]

Figure 17:
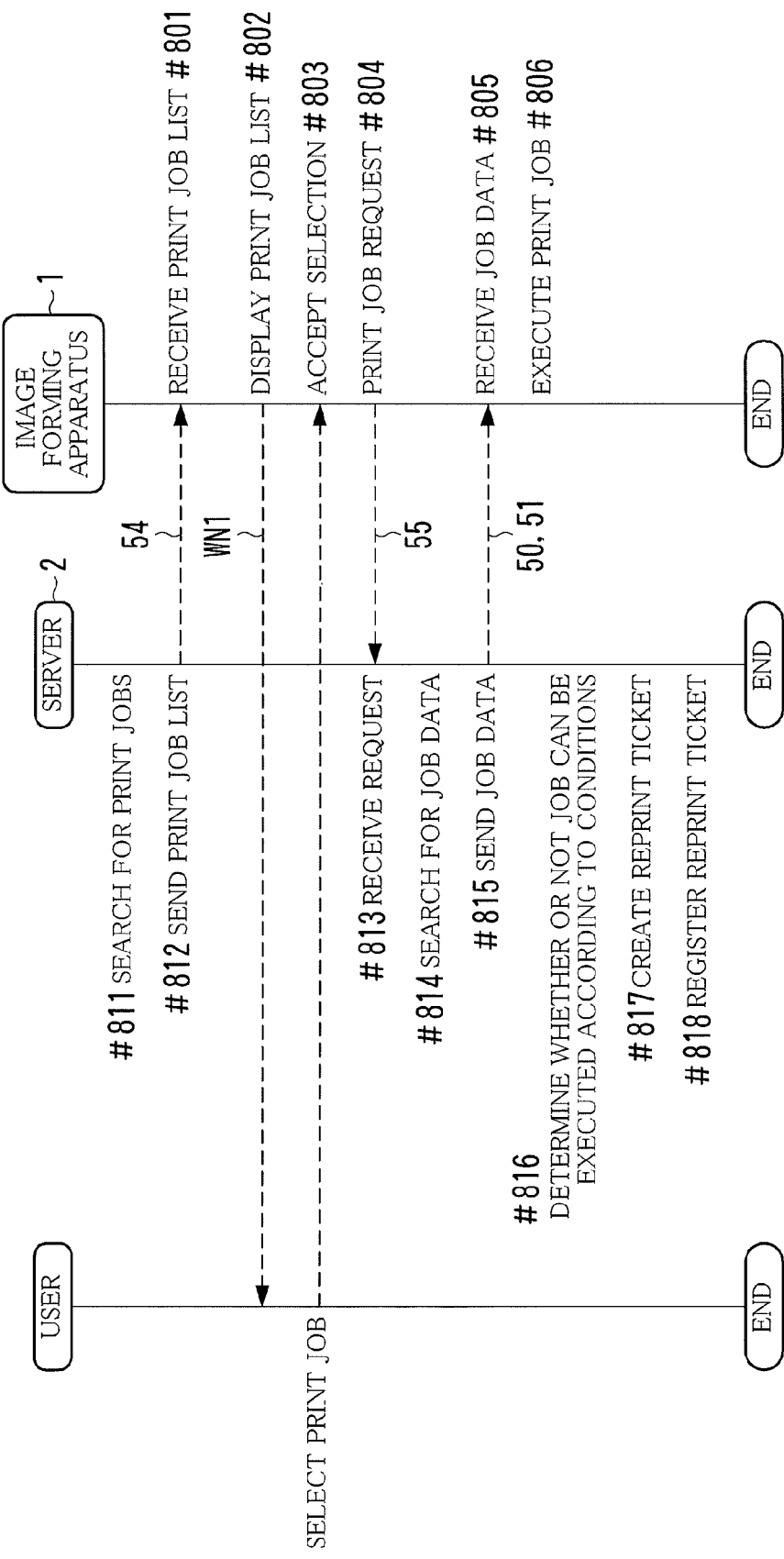
FIG. 17 is a sequence diagram depicting a modification of the flow of processing for reprint ticket registration.
Figure 18:
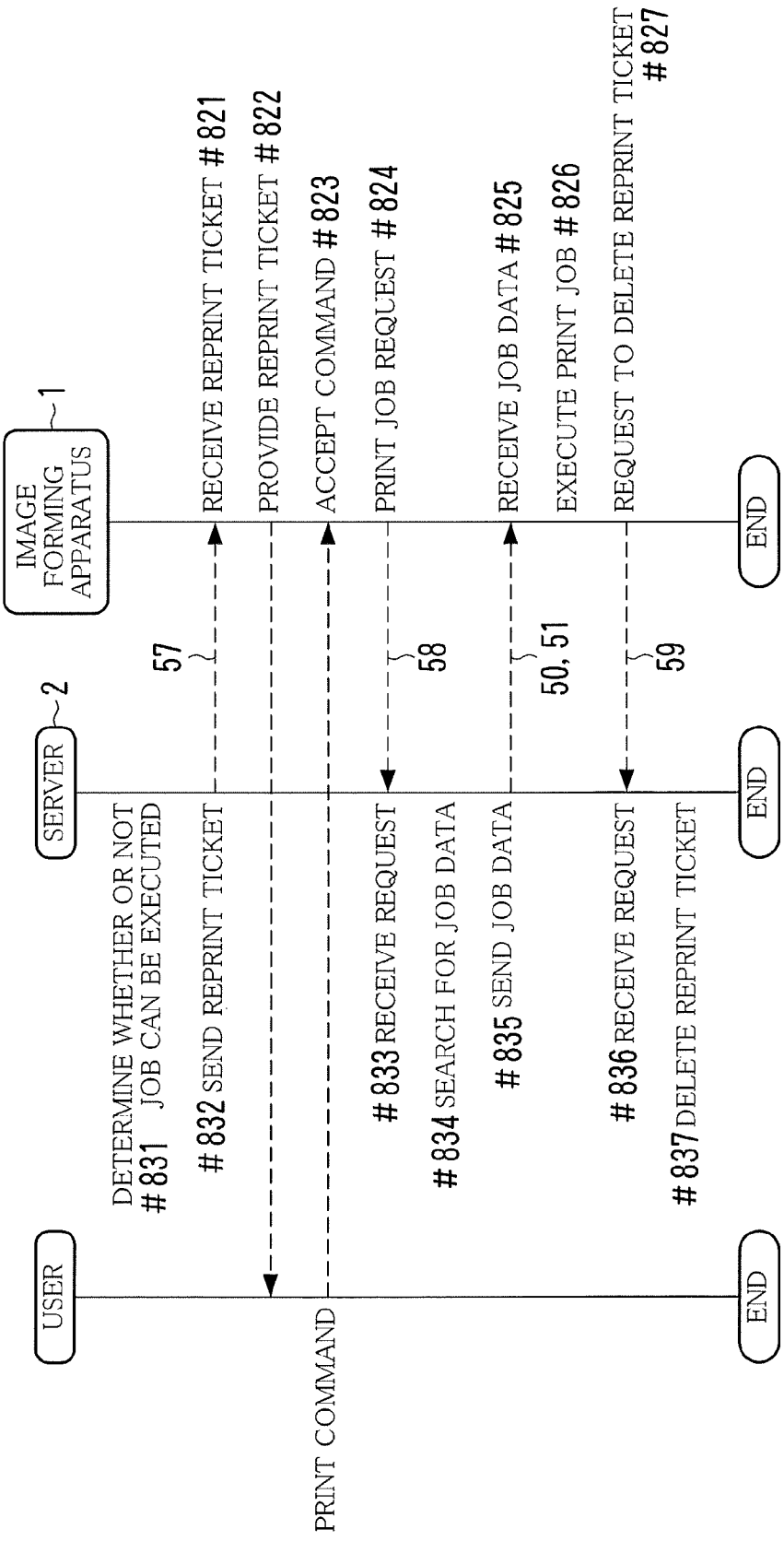
FIG. 18 is a sequence diagram depicting a modification of the flow of processing performed when a print job is executed based on a reprint ticket.

FIG. 17 is a sequence diagram depicting a modification of the flow of processing for reprint ticket registration. FIG. 18 is a sequence diagram depicting a modification of the flow of processing performed when a print job is executed based on a reprint ticket.

In the first embodiment, it is the image forming apparatus 1 that determines whether or not a print job can be executed according to printing conditions. It is also the image forming apparatus 1 that determines whether or not a reprint ticket is issued and whether or not the reprint ticket is presented to a user.

In the second embodiment, the server 2 rather than the image forming apparatus 1 make such determinations. Hereinafter, descriptions are given of the processing by the image forming apparatus 1 and the server 2 in the second embodiment. Description of points common to the first embodiment shall be omitted.

The overall configuration of the network system 1NS is similar to that of the first embodiment as shown in FIG. 1. Likewise, the hardware configurations of the image forming apparatus 1 and the server 2 are similar to those of the first embodiment as shown in FIG. 2 and FIG. 3.

Note, however, that the server 2 is provided with functional elements equivalent to the first execution determination portion 104 and the second execution determination portion 108 shown in FIG. 10. The image forming apparatus 1 and the server 2 perform processing in the following manner.

The processing for registering a print job ticket and the user authentication processing before pull printing are the same as those of the first embodiment. The former processing and the latter processing are described earlier with reference to FIGS. 4 and 5, respectively.

The processing for registering a reprint ticket is performed in the manner as shown in FIG. 17 instead of the manner shown in FIG. 6.

The processing for sending/receiving the job list data 54, the job request data 55, the print data 50, and the attribute data 51 and the processing for displaying the job list screen WN1 are basically the same as those of the first embodiment (Steps #751-#755, Steps #741-#745 of FIG. 6), and are shown in Steps #801-#805, and Steps #811-#815 of FIG. 17. Note, however, that the job request data 55 contains not only a job identification code but also a user code of a login user.

Unlike the first embodiment, it is the server 2 that determines whether or not the image forming apparatus 1 can execute a print job according to printing conditions defined in the attribute data 51 (Step #816). The server 2 may store in advance, into a predetermined storage location, information on the specifications of the image forming apparatus 1. Alternatively, the server 2 may obtain, in Step #804, such information together with the job request data 55 from the image forming apparatus 1.

When determining that the image forming apparatus 1 cannot execute the print job according to the printing conditions, the server 2 creates reprint ticket data 57 indicating the job identification code contained in the job request data 55, the user code, and the printing conditions for the print job (Step #817), and stores the created reprint ticket data 57 (Step #818).

The processing for executing a print job based on a reprint ticket is performed in the manner as shown in FIG. 18 instead of the manner shown in FIG. 8.

In the first embodiment, the server 2 sends a reprint ticket to the image forming apparatus 1 independent of whether or not the image forming apparatus 1 can execute a print job according to printing conditions defined in the reprint ticket. In the second embodiment, however, the server 2 sends only a reprint ticket of a print job executable by the image forming apparatus 1.

To be specific, even if the server 2 knows in Step #733 of FIG. 5, that data on a reprint ticket, namely, reprint ticket data 57, of a login user is stored therein, the server 2 does not send the reprint ticket data 57 to the login user promptly. Instead of this, the server 2 determines whether or not the image forming apparatus 1 operated by the login user can execute the print job according to the printing conditions defined in the reprint ticket data 57 (Step #831). Only when the determination result is positive, the server 2 sends the reprint ticket data 57 (Step #832).

Thereafter, the server 2 performs the processing (Steps #833-#837) similar to the processing of Steps #762-#766 of FIG. 8 in the first embodiment.

On the other hand, when receiving the reprint ticket data 57 (Step #821), the image forming apparatus 1 presents the reprint ticket to the login user (Step #822) without determining whether or not the image forming apparatus 1 can execute the print job according to the printing conditions. Thereafter, as with the processing of Steps #774-#778 of the first embodiment, the image forming apparatus 1 downloads (Steps #823 and #824) print data 50 and attribute data 51 in accordance with selection by the login user to execute the print job (Step #826). After the execution, the image forming apparatus 1 requests the server 2 to delete the reprint ticket (Step #827).

Figure 19:
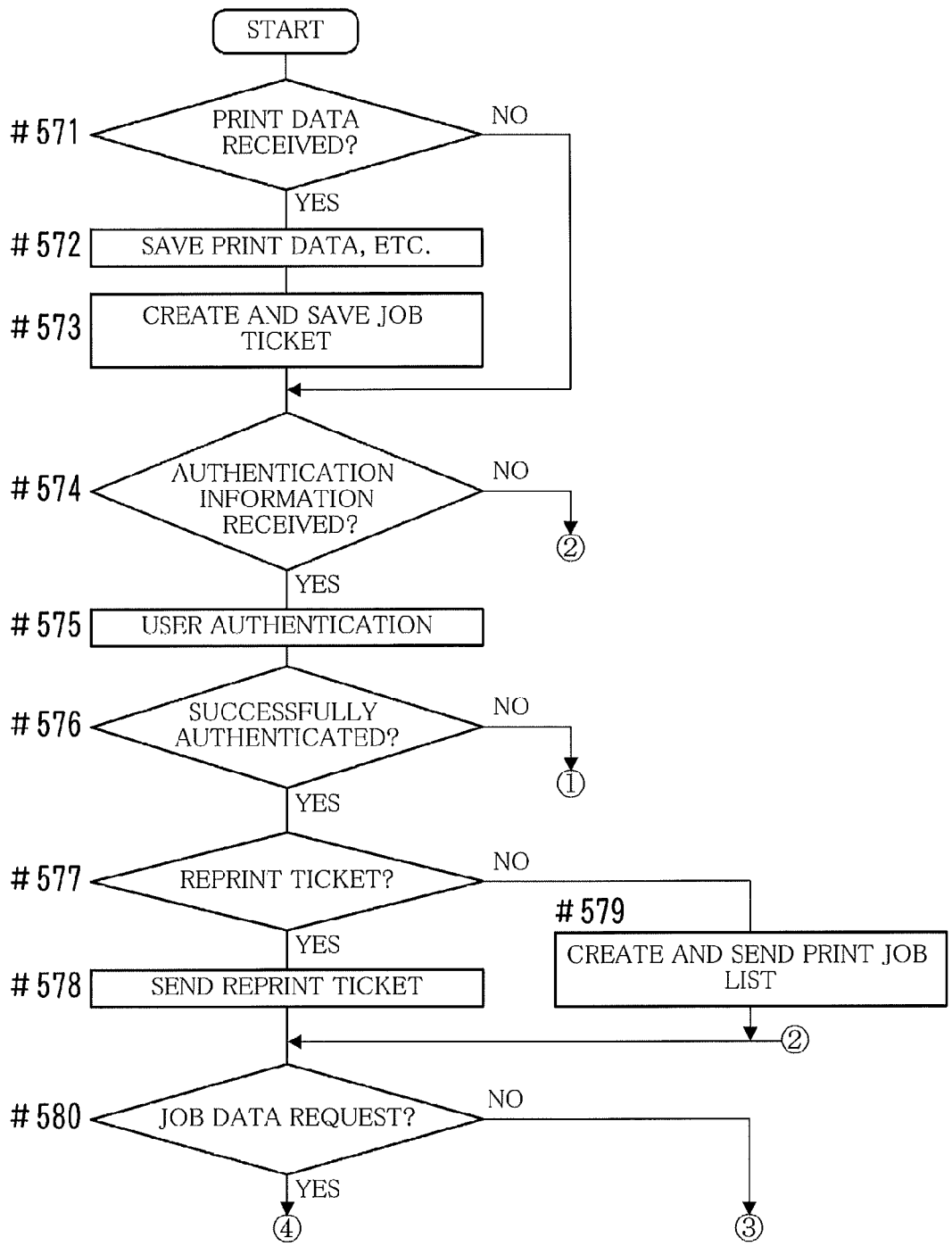
FIG. 19 is a flowchart depicting an example of the flow of overall processing performed by a server according to a second embodiment.
Figure 20:
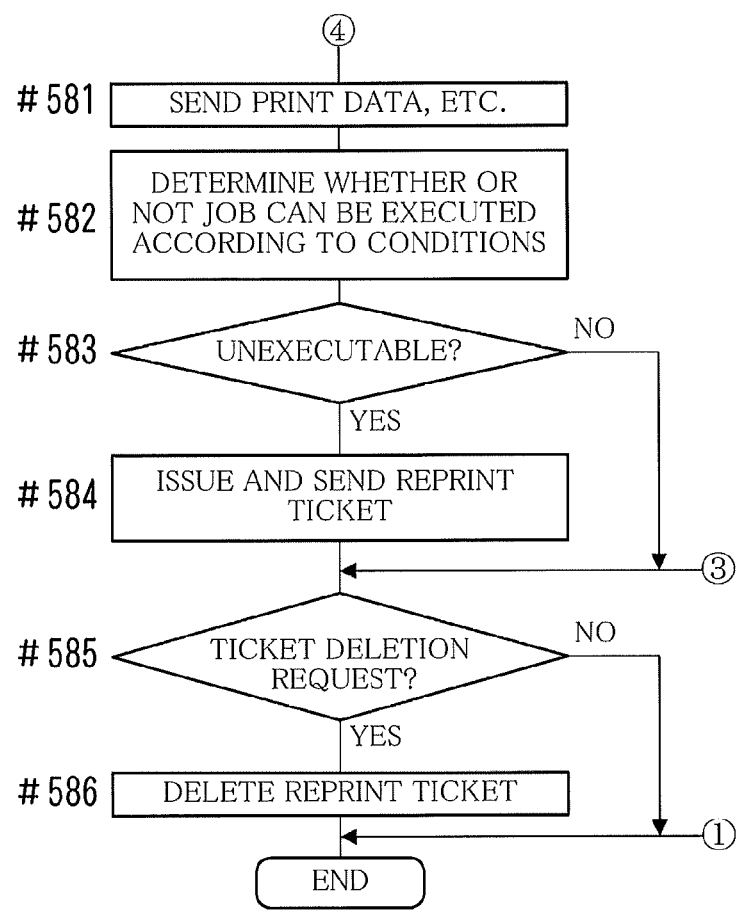
FIG. 20 is a flowchart depicting an example of the flow of overall processing performed by a server according to the second embodiment.
Figure 21:
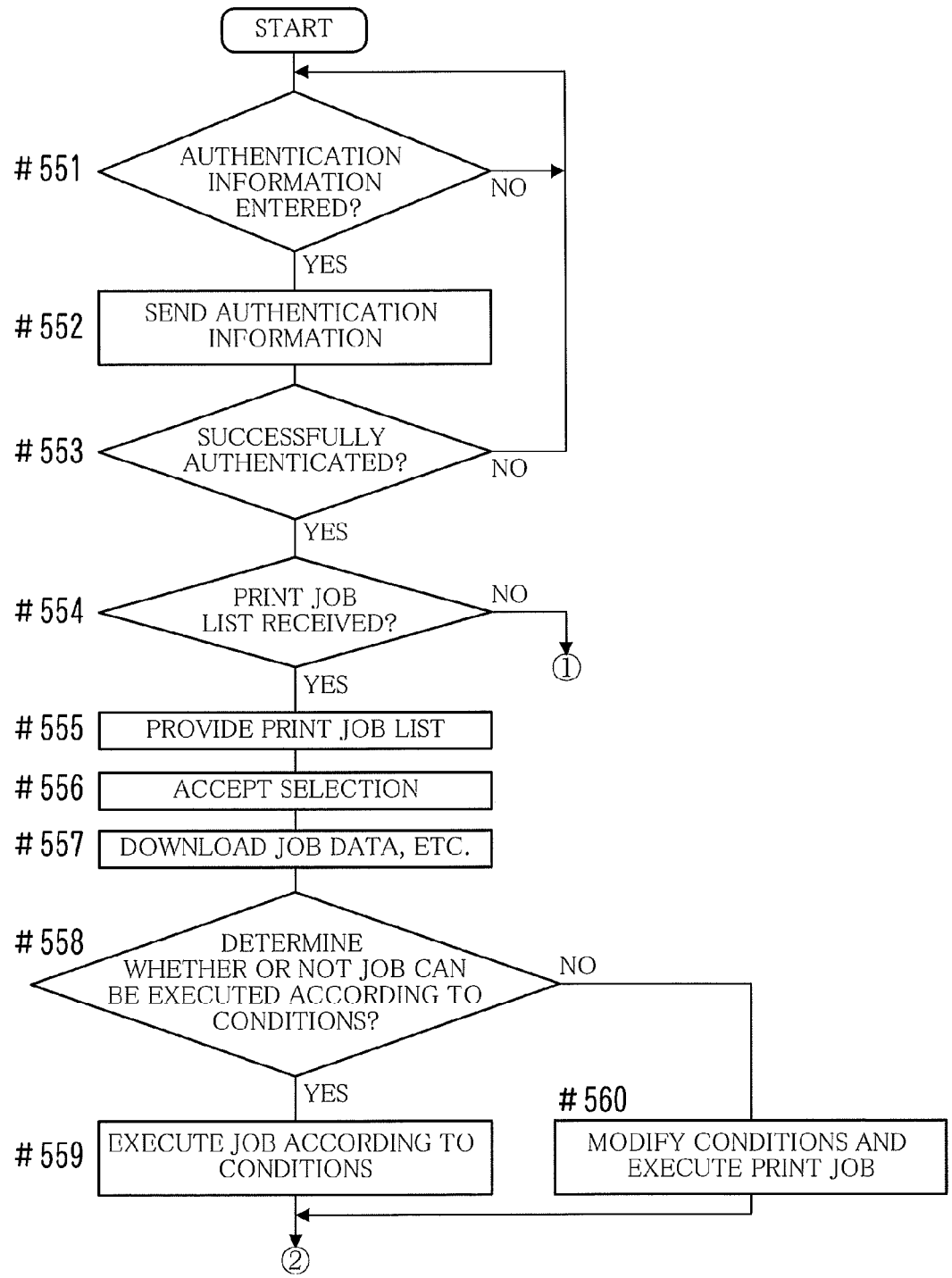
FIG. 21 is a flowchart depicting an example of the flow of overall processing performed by an image forming apparatus according to the second embodiment.
Figure 22:
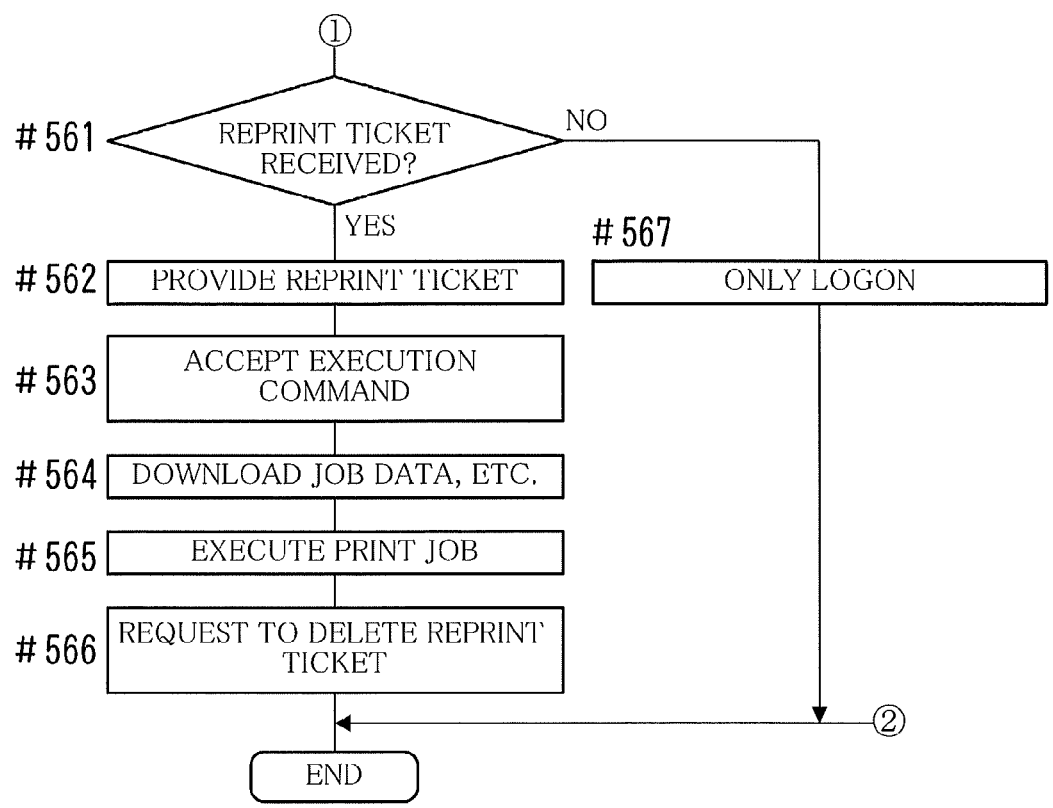
FIG. 22 is a flowchart depicting an example of the flow of overall processing performed by an image forming apparatus according to the second embodiment.

FIGS. 19 and 20 are flowcharts depicting an example of the flow of overall processing performed by the server 2 according to the second embodiment. FIGS. 21 and 22 are flowcharts depicting an example of the flow of overall processing performed by the image forming apparatus 1 according to the second embodiment.

The difference between the first embodiment and the second embodiment is known also from the flowcharts. As discussed earlier with reference to FIGS. 13 and 14, in the first embodiment, the image forming apparatus 1 determines whether or not a print job can be executed according to printing conditions (Steps #508 and #513). In contrast, in the second embodiment, the server 2 makes such determinations in the following manner.

The server 2 searches for job request data 58 corresponding to a print job that can be executed according to the printing conditions by the image forming apparatus 1 as the request source. If such job request data 58 is found by the search (Yes in Step #577 of FIG. 19), then the server 2 sends the job request data 58 to the image forming apparatus 1 (Step #578).

When sending print data 50 and attribute data 51 to the image forming apparatus 1, the server 2 determines whether or not a print job can be executed according to the printing conditions (Step #582 of FIG. 20). If the determination result is not positive (Yes in Step #583), then the server 2 issues a reprint ticket to the image forming apparatus 1 without receiving a request from the image forming apparatus 1 (Step #584).

Thus, as shown in FIGS. 21 and 22, the image forming apparatus 1 does not determine whether or not a print job can be executed according to the printing conditions, and does not make a request to issue a reprint ticket.

[Third Embodiment]

Figure 23:
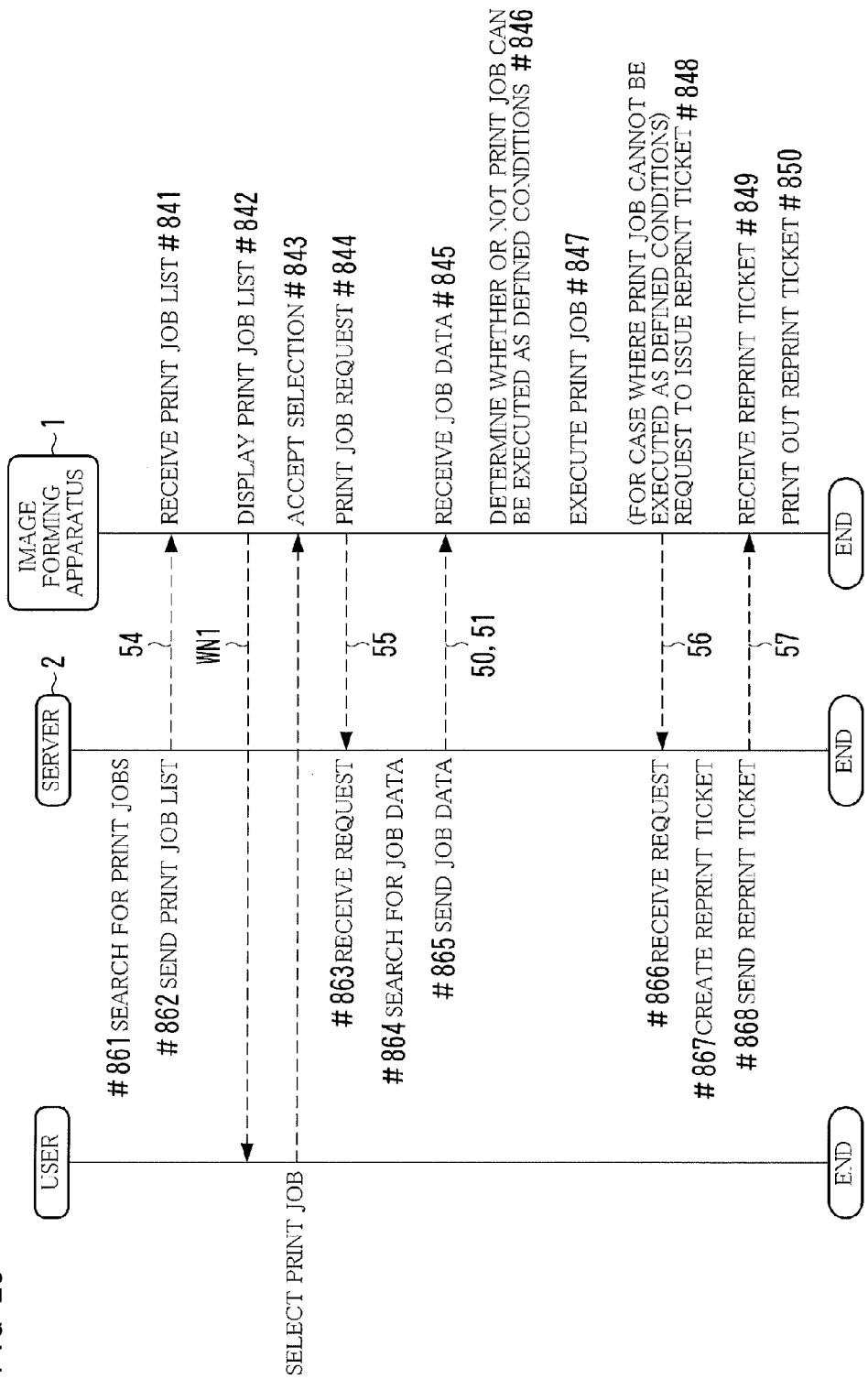
FIG. 23 is a sequence diagram depicting a modification of the flow of processing for reprint ticket registration.
Figure 24:
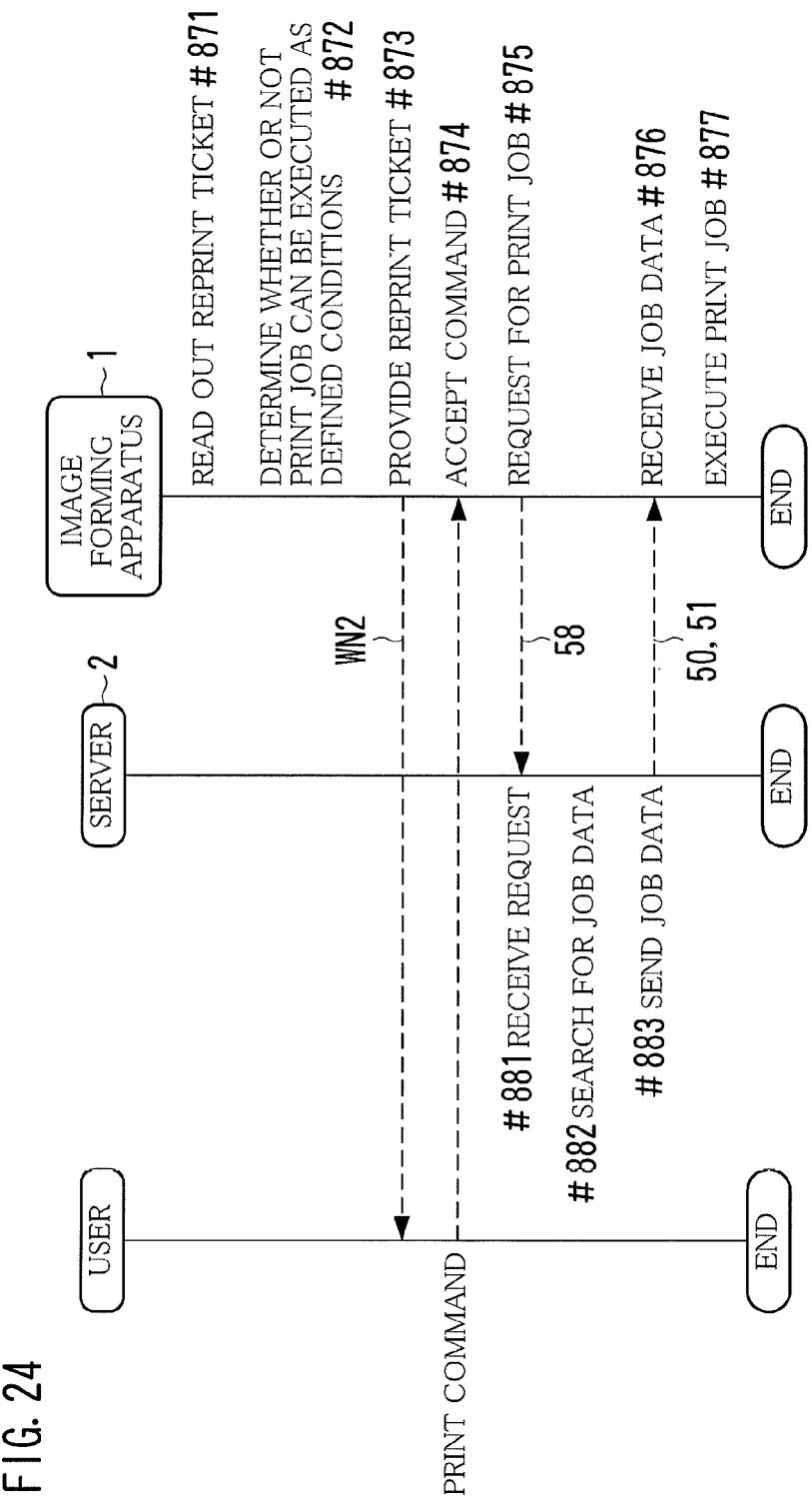
FIG. 24 is a sequence diagram depicting a modification of the flow of processing performed when a print job is executed based on a reprint ticket.

FIG. 23 is a sequence diagram depicting a modification of the flow of processing for reprint ticket registration. FIG. 24 is a sequence diagram depicting a modification of the flow of processing performed when a print job is executed based on a reprint ticket.

In the first and second embodiments, digital data of a reprint ticket is created and the resultant is stored into the server 2.

In contrast, according to the third embodiment, a reprint ticket is printed onto paper and the resultant is provided to a login user. The following is a description of processing by the image forming apparatus 1 and the server 2 according to the third embodiment. In particular, the description is given by comparing the processing between the first embodiment and the third embodiment. Descriptions of parts that are identical with those in the first embodiment are omitted.

The overall configuration of the network system 1NS is similar to that of the first embodiment as shown in FIG. 1. Likewise, the hardware configurations of the image forming apparatus 1 and the server 2 are similar to those of the first embodiment as shown in FIG. 2 and FIG. 3.

The image forming apparatus 1 and the server 2 perform processing in the following manner. The processing for registering a print job ticket and the user authentication processing before pull printing are the same as those of the first embodiment. The former processing and the latter processing are described earlier with reference to FIGS. 4 and 5, respectively.

The processing for issuing a reprint ticket is performed in the manner as shown in FIG. 23 instead of the manner shown in FIG. 6.

When the image forming apparatus 1 cannot execute a print job according to printing conditions, the image forming apparatus 1 requests the server 2 to issue a reprint ticket (Steps #841-#848 and Steps #861-#866 of FIG. 23). This processing is the same as the processing of Steps #751-#758 and Steps #741-#746 as shown in FIG. 6.

The server 2 creates reprint ticket data 57 (Step #867), and sends the reprint ticket data 57 to the image forming apparatus 1 (Step #868), instead of saving the reprint ticket 57 to the reprint ticket data storage portion 2K2. When receiving the reprint ticket data 57 (Step #849), the image forming apparatus 1 prints, onto paper, information on the reprint ticket, e.g., the job identification code, the user code, print job conditions indicated in the reprint ticket data 57 (Step #850). The information on the reprint ticket may contain the password of the user corresponding to the user code. In such a case, however, the information on the reprint ticket is desirably encrypted before printing.

FIG. 23 shows the flow of processing performed when a target image corresponding to this print job and information on the reprint ticket are separately printed onto different sheets of paper. Another arrangement is possible in which the target image and the information on the reprint ticket are printed on one sheet of paper. In such a case, the information on the reprint ticket may be embedded, as a background pattern image, into the target image for printing. Alternatively, the information on the reprint ticket may be printed in a margin of paper.

The processing for executing a print job based on a reprint ticket is performed in the manner as shown in FIG. 24 instead of the manner shown in FIG. 8.

In the first embodiment, when a user is successfully authenticated, and when the server 2 has a reprint ticket of the login user, the server 2 sends the data thereon, namely, the reprint ticket data 57, to the image forming apparatus 1 (Step #761 of FIG. 8). In the third embodiment, the server 2 cannot send the reprint ticket data 57 as not saving the same thereto. Instead, the user places a sheet on which reprint ticket information is printed onto the scanner unit 10e of the image forming apparatus 1.

In response to this operation, the image forming apparatus 1 reads out the reprint ticket information (Step #871 of FIG. 24) and determines whether or not the image forming apparatus 1 can execute a print job according to printing conditions (Step #872).

If the determination result is positive, then the image forming apparatus 1 and the server 2 perform the processing of Steps #873-#877 and Steps #881-#883 basically in the same manner as that of the processing of Steps #773-#777 and Steps #762-#764 of the first embodiment.

When the user has not yet been verified, the image forming apparatus 1 sends a user code and password of the user to the server 2 in Step #875 where a request for print data 50, etc. is made. The server 2 performs user authentication based on the user code and password sent from the image forming apparatus 1. If the user is successfully authenticated, then the server 2 sends print data 50 and attribute data 51. Processing to delete the reprint ticket data 57 is unnecessary (Steps #778 and #765-#766 of FIG. 8).

Figure 25:
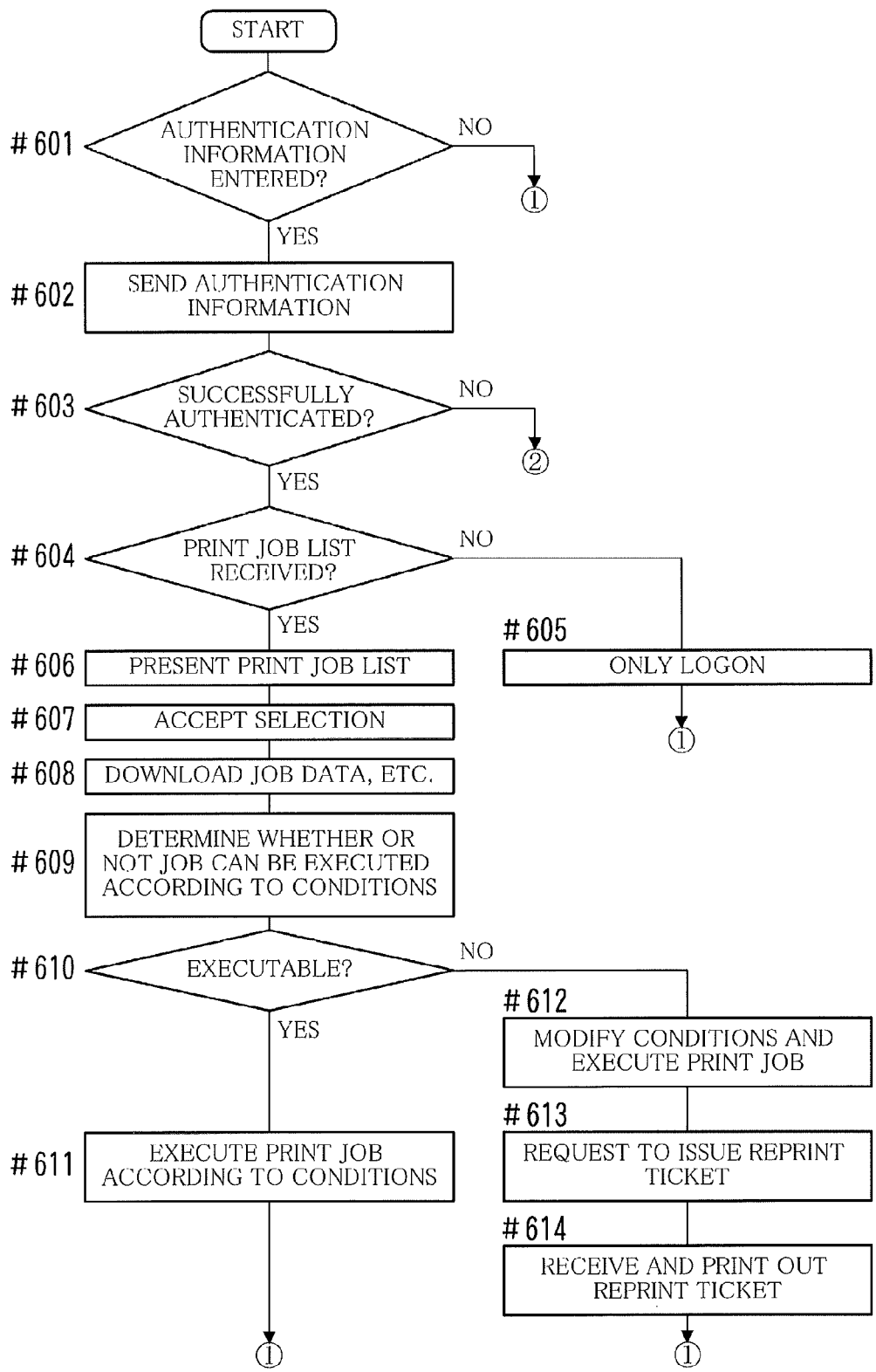
FIG. 25 is a flowchart depicting an example of the flow of overall processing performed by an image forming apparatus according to a third embodiment.
Figure 26:
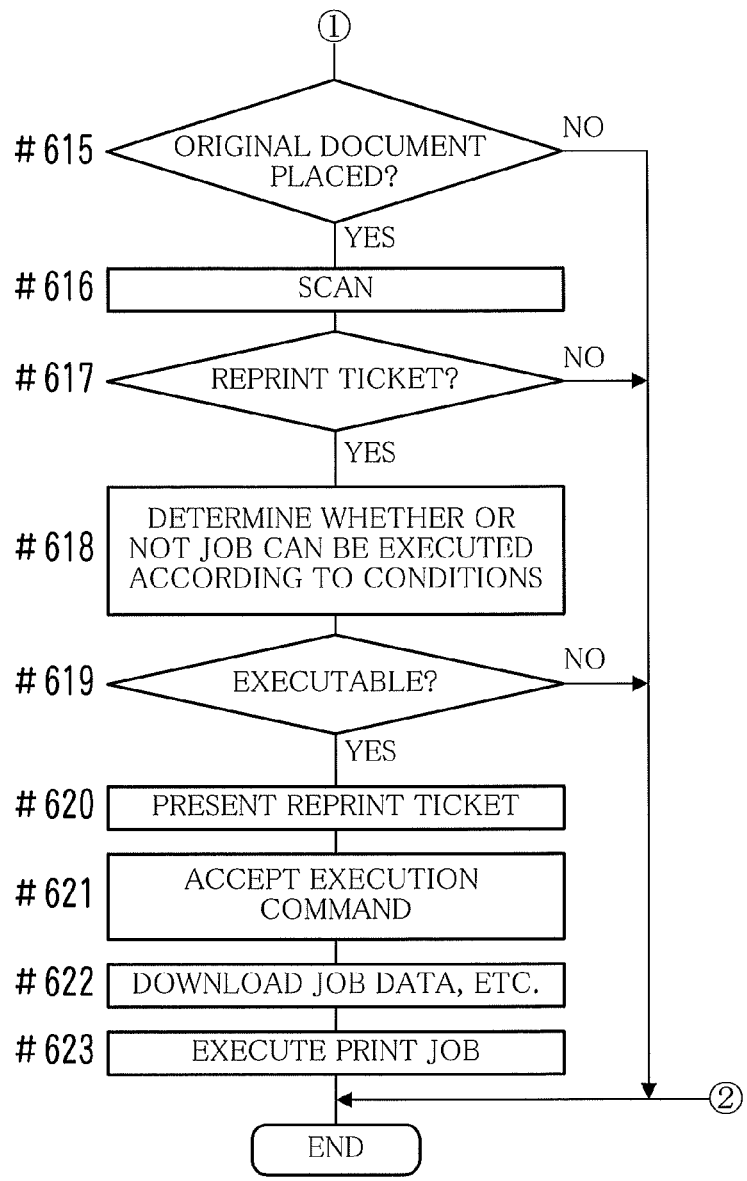
FIG. 26 is a flowchart depicting an example of the flow of overall processing performed by an image forming apparatus according to the third embodiment.

FIGS. 25 and 26 are flowcharts depicting an example of the flow of overall processing performed by the image forming apparatus 1 according to the third embodiment. FIG. 27 is a flowchart depicting an example of the flow of overall processing performed by the server 2 according to the third embodiment.

In the third embodiment, every time a user performs operation or every time data is sent by the server 2, the image forming apparatus 1 performs the processing appropriately as shown in FIGS. 25 and 26.

When the user enters a user code and a password (Yes in #601 of FIG. 25), the image forming apparatus 1 sends the user code and password to the server 2 and requests the server 2 to perform user authentication (Step #602).

When the user is successfully authenticated (Yes in Step #603), but, when no job list data 54 is received (No in Step #604), the user is only allowed to log onto the server 2 (Step #605).

On the other hand, when receiving job list data 54 (Yes in Step #604), the image forming apparatus 1 performs processing in a manner similar to the processing of Steps #505-#512 of FIG. 13 in the first embodiment. To be specific, the image forming apparatus 1 displays the job list screen WN1 (see FIG. 7), downloads print data 50 and attribute data 51 on a print job selected by the login user, and executes the print job. If the print job cannot be executed according to the printing conditions, then the image forming apparatus 1 requests the server 2 to issue a reprint ticket (Steps #606-#613). In the third embodiment, the image forming apparatus 1 receives data on the reprint ticket issued by the server 2, namely, reprint ticket data 57, and prints information on the reprint ticket (Step #614).

When a sheet of paper is placed onto the scanner unit 10e (Yes in Step #615 of FIG. 26), the image forming apparatus 1 scans an image on the paper (Step #616). When the information on the reprint ticket is read out (Yes in Step #617), the image forming apparatus 1 performs processing in a manner similar to the processing of Steps #513-#518 of FIG. 14 in the first embodiment. To be specific, the image forming apparatus 1 downloads, from the server 2, print data 50 and attribute data 51 of a print job indicated in the reprint ticket and executes the print job (Steps #618-#623).

On the other hand, every time data is sent from the image forming apparatus 1 or the terminal 3, the server 2 performs the processing appropriately as shown in FIG. 27.

The processing for registering a new job ticket and the processing for user authentication (Steps #631-#635 of FIG. 27) are similar to the processing of Steps #531-#535 of FIG. 15 in the first embodiment.

In the first embodiment, when a user is successfully authenticated, the server 2 searches for a reprint ticket corresponding to the login user. In contrast, in the third embodiment, searching for such a reprint ticket is not performed. Instead, the server 2 searches for a job ticket for a print job that the login user is authorized to give a command to execute, and sends job list data 54 to the image forming apparatus 1 (Yes in Step #637 and Step #638).

When being requested, by the image forming apparatus 1, to send print data 50 and attribute data 51 (Yes in Step #639), the server 2 sends the print data 50 and the attribute data 51 to the image forming apparatus 1 as with the first embodiment (Step #640). However, when the user authentication processing has not yet been finished, the server 2 obtains a user code and a password from the image forming apparatus 1 and sends the print data 50 and the attribute data 51 after verifying the user.

When being requested to issue a reprint ticket (Yes in Step #641), the server 2 creates reprint ticket data 57 to send the same to the image forming apparatus 1 (Step #642).

In the foregoing example, it is the server 2 that creates reprint ticket data 57. Instead of this, however, the image forming apparatus 1 may create the reprint ticket data 57. Further, as with the second embodiment, it is possible that not the image forming apparatus 1 but the server 2 determines whether or not a print job can be executed according to printing conditions.

According to the first through third embodiments, a printed matter desired by a user can be obtained by resubmitting a print job more reliably than with the conventional methods.

In the first through third embodiments, it is the server 2 that gives a job identification code to a print job. Instead of this, it is possible to use, as the job identification code, a name that is easy to understand for a user, e.g., a document name represented by a print target image. Alternatively, it is possible to incorporate a name together with a job identification code into, for example, the job ticket data 52, the job list data 54, the reprint ticket data 57, and to present the name and the job identification code to the user.

Another configuration is possible in which an expiry date is set for a reprint ticket, and when the reprint ticket is expired, a print job based on the reprint ticket is prohibited from being executed.

It is to be understood that the configurations of the network system 1NS, the image forming apparatus 1, and the server 2, the constituent elements thereof, the content and order of the processing, the configuration of data, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A printing system having a plurality of connected image forming apparatuses, comprising:
    a central processor that controls portions of the system, including
    a registration portion configured to, in response to when a print job to print an image onto a sheet of paper is executed at a first image forming apparatus according to different printing conditions than originally specified in the print job, store attribute data of the print job for which specified printing conditions have not yet been modified, the attribute data containing a user identifier and a job identifier, into a storage portion, the user identifier being for identifying a user who has given a command to execute the print job, the job identifier being for identifying the print job;
    a determining portion configured to, when the user identifier is entered, determine whether or not the print job corresponding to the job identifier of the attribute data containing the user identifier can be executed at a second image forming apparatus in accordance with the original printing conditions; and
    a re-execution portion configured to, when the determining portion determines that the print job can be executed in accordance with the original printing conditions at the second image forming apparatus, execute the print job again at the second image forming apparatus according to the original printing conditions.

2. The printing system according to claim 1, comprising a printer configured to print, onto a sheet of paper, the job identifier and the user identifier contained in the attribute data.

3. The printing system according to claim 1, wherein the printing conditions include at least one of color/monochrome printing, a number of sets of prints, paper size, and stapling.

4. A server for distributing, to a plurality of image forming apparatuses connected in a network, print job data used for executing a print job to print an image onto a sheet of paper, the server comprising:
    a central processor that controls portions of the server, including
    a registration portion configured to, in response to when a first image forming apparatus that is one of the plurality of image forming apparatus executes the print job according to different printing conditions than originally specified in the print job, store attribute data of the print job for which specified printing conditions have not yet been modified, the attribute data containing a user identifier and a job identifier into a storage portion, the user identifier being for identifying a user who has given a command to execute the print job, the job identifier being for identifying the print job; and
    a transmission portion configured to, when a determination is made as to whether or not the print job corresponding to the job identifier of the attribute data containing the user identifier of a user of a second image forming apparatus that is one of the plurality of image forming apparatus can be executed in accordance with the original printing conditions, and when it is determined that the print job can be executed at the second image forming apparatus in accordance with the original printing conditions, send the print job data on the print job to the second image forming apparatus for printing according to the original printing conditions.

5. The server according to claim 4, wherein the determination is made by the second image forming apparatus.

6. The server according to claim 4, comprising a determination portion configured to make the determination.

7. The server according to claim 4, comprising a deletion portion configured to, when the transmission portion sends the print job corresponding to the job identifier contained in the attribute data, delete the attribute data from the storage portion.

8. The server according to claim 4, wherein the printing conditions include at least one of color/monochrome printing, a number of sets of prints, paper size, and stapling.

9. A method for resubmitting a print job, the method comprising:
    in response to when a print job to print an image onto a sheet of paper is executed at a first image forming apparatus according to different printing conditions than originally specified in the print job, storing attribute data of the print job for which specified printing conditions have not yet been modified, the attribute data containing a user identifier and a job identifier into a storage portion, the user identifier being for identifying a user who has given a command to execute the print job, the job identifier being for identifying the print job;
    when the user identifier is entered, determining whether or not the print job corresponding to the job identifier of the attribute data containing the user identifier can be executed at a second image forming apparatus in accordance with the original printing conditions; and
    executing the print job again at the second image forming apparatus according to the original printing conditions when it is determined that the print job can be executed at the second image forming apparatus in accordance with the original printing conditions.

10. The method according to claim 9, wherein the printing conditions include at least one of color/monochrome printing, a number of sets of prints, paper size, and stapling.

11. A non-transitory computer-readable storage medium storing thereon a computer program used in a computer for distributing, to a plurality of image forming apparatus, print job data used for executing a print job to print an image onto a sheet of paper, the computer program causing the computer to implement processes comprising:

processing for storing, in response to when a first image forming apparatus that is one of the plurality of image forming apparatus executes the print job according to different printing conditions than originally specified in the print job, attribute data of the print job for which specified printing conditions have not yet been modified, the attribute data containing a user identifier and a job identifier into a storage portion, the user identifier being for identifying a user who has given a command to execute the print job, the job identifier being for identifying the print job; and processing for sending, when a determination is made as to whether or not the print job corresponding to the job identifier of the attribute data containing the user identifier of a user of a second image forming apparatus that is one of the plurality of image forming apparatus and can be executed in accordance with the original printing conditions, and when it is determined that the print job can be executed at the second image forming apparatus in accordance with the original printing conditions, the print job data on the print job to the second image forming apparatus for printing according to the original printing conditions.

12. The non-transitory computer-readable storage medium according to claim 11, wherein the printing conditions include at least one of color/monochrome printing, a number of sets of prints, paper size, and stapling.

* * * * *